United States Patent
Harada et al.

(10) Patent No.: US 8,266,385 B2
(45) Date of Patent: Sep. 11, 2012

(54) TECHNIQUE AND APPARATUS FOR IDENTIFYING CACHE SEGMENTS FOR CACHING DATA TO BE WRITTEN TO MAIN MEMORY

(75) Inventors: Nobuyuki Harada, Machida (JP); Takeo Nakada, Kawaguchi (JP); Nobuyuki Ohba, Sendai (JP)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 12/129,090

(22) Filed: May 29, 2008

(65) Prior Publication Data

US 2008/0301373 A1 Dec. 4, 2008

(30) Foreign Application Priority Data

May 30, 2007 (JP) .................................. 2007-143968

(51) Int. Cl.
*G06F 12/00* (2006.01)
*G06F 13/00* (2006.01)
*G06F 13/28* (2006.01)
(52) U.S. Cl. ....................................................... 711/133
(58) Field of Classification Search .................... 711/133
See application file for complete search history.

(56) References Cited

U.S. PATENT DOCUMENTS

| 5,778,422 A | * | 7/1998 | Genduso et al. | ............... 711/117 |
| 2005/0182893 A1 | * | 8/2005 | Suh | ................................ 711/103 |

* cited by examiner

*Primary Examiner* — Kevin Ellis
*Assistant Examiner* — Chad Davidson
(74) *Attorney, Agent, or Firm* — William Stock; Anne Vachon Dougherty

(57) ABSTRACT

A memory apparatus having a cache memory including cache segments, and memorizing validity data indicative of whether or not each of the sectors contained in each cache segment is a valid sector inclusive of valid data; and a cache controlling component for controlling access to the cache memory. The cache controlling component includes a detecting component for detecting, when writing a cache segment back to the main memory, areas having consecutive invalid sectors by accessing validity data corresponding to the cache segment, and a write-back controlling component issuing a read command to the main memory, the read command being for reading data into each area detected, making the area a valid sector, and writing the data in the cache segment back to the main memory.

15 Claims, 20 Drawing Sheets

| SECTOR NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| VALIDITY DATA | 1 | 1 | 0 | 0 | 0 | 0 | 1 | 1 | 0 | 0 | 0 | 0 | 0 | 0 | 1 | 1 |
| SETTING OF BIT INVERTING COMPONENT | | | | | | | XOR | 0 | | | | | | | | |
| OUTPUT OF BIT INVERTING COMPONENT | 1 | 1 | 0 | 0 | 0 | 0 | 1 | 1 | 0 | 0 | 0 | 0 | 0 | 0 | 1 | 1 |
| MASK DATA | 0 | 0 | 1 | 1 | 1 | 1 | 1 | 1 | 1 | 1 | 1 | 1 | 1 | 1 | 1 | 1 |
| OUTPUT OF MASK SECTION | 0 | 0 | 0 | 0 | 0 | 0 | 1 | 1 | 0 | 0 | 0 | 0 | 0 | 0 | 1 | 1 |
| PRIORITY ENCODER OUTPUT | | | | | | | 7 | | | | | | | | | |

TECHNIQUE AND APPARATUS FOR IDENTIFYING CACHE SEGMENTS FOR CACHING DATA TO BE WRITTEN TO MAIN MEMORY

TECHNICAL FIELD

The present invention relates to a cache memory, and more particularly, to a technique for caching data to be written back to a main memory in a cache memory.

BACKGROUND ART

Semiconductor disk devices, such as a USB memory, using a flash memory, are widely used in recent years. Semiconductor disk devices are requested to have higher capacity, higher speed, and more power saving according to the expansion of its use. Flash memories have different characteristics from DRAMs in some respects. For example, on writing data to a NAND-type flash memory, the area to which the data is to be written must be erased beforehand. The erasing process requires very long time as compared with a reading process. Moreover, flash memories become inoperative when the number of accesses reaches a specified limit.

To cope with such characteristics of flash memories, it is desirable to combine multiple accesses to a flash memory into a single access. One technique that combines multiple accesses to one is access command buffering. For example, two or more write commands for a flash memory are temporarily stored in a buffer, and the write commands to one sector are combined to one write command, and then issued to the flash memory. However, the amount of data to be written varies in each write access. Therefore, it is difficult to make use of the full capacity of the buffer so as to store a large number of commands efficiently.

Furthermore, a cache memory of CPU may be used to execute a plurality of accesses at one time. However, the cache memory of CPU is primarily used to increase memory access speed, not to decrease the number of accesses to the main memory. For this reason, it does not work well for flash memories.

The objective of this invention is to provide a memory apparatus, method, and program for solving the above-mentioned problems. The objective is attained by combinations of the features described in the independent claims. The dependent claims specify further advantageous examples of the invention.

SUMMARY OF THE INVENTION

To solve the above problems, according to a first aspect of the invention, there is provided a memory apparatus that caches data to be written to a main memory. The memory apparatus includes: a cache memory including a plurality of cache segments, and memorizing, for each cache segment, validity data indicative of whether or not each of the sectors contained in each cache segment is a valid sector inclusive of valid data; and a cache controlling component for controlling access to the cache memory. The cache controlling component includes: a detecting component for detecting, when writing a cache segment back to the main memory, areas having consecutive invalid sectors by accessing validity data corresponding to the cache segment; and a write-back controlling component issuing a read command to the main memory, the read command being for reading data to each area detected, making the area a valid sector, and writing the data in the cache segment back to the main memory. There are also provided a method and a program for controlling the memory apparatus. The outline of the invention does not include all the necessary features of the invention but subcombinations of the features can also be included in the invention.

BRIEF DESCRIPTION OF THE DRAWINGS

FIG. 14 shows the details of step S1260 (S1260-1) of the first cycle.

DETAILED DESCRIPTION OF THE INVENTION

The invention will be further illustrated with reference to embodiments of the invention. However, it is to be understood that the embodiments do not limit the invention according to the claims and that all the combinations of the features described in the embodiment are not essential to achieve the object.

Figure 1:
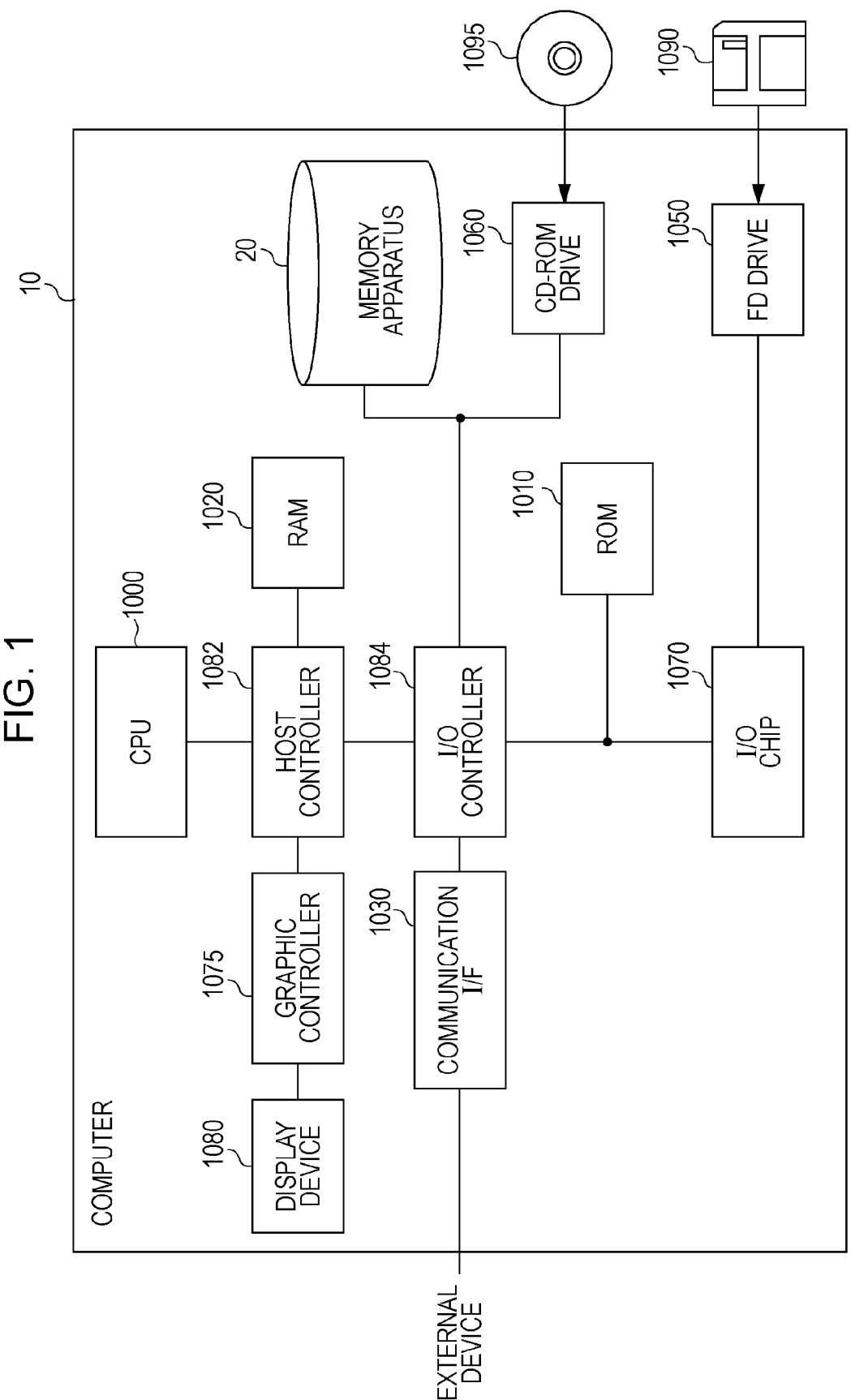
FIG. 1 shows an example of the hardware structure of a computer 10 according to an embodiment.

FIG. 1 shows an example of the hardware structure of a computer 10 according to an embodiment. The computer 10 includes a CPU 1000 and CPU peripherals including a RAM 1020 and a graphic controller 1075, which are connected to each other by a host controller 1082. The computer 10 further includes a communication interface 1030, a memory apparatus 20, and an input/output section including a CD-ROM drive 1060 which are connected to the host controller 1082 via an input/output controller 1084. The computer 10 may further include a ROM 1010 connected to the input/output controller 1084 and a legacy input/output section including a flexible disk drive 1050 and an input/output chip 1070.

The host controller 1082 connects the RAM 1020 to the CPU 1000 which has access to the RAM 1020 at a high transfer rate and to the graphic controller 1075. The CPU 1000 operates according to programs stored in the ROM 1010 and the RAM 1020 to control the components. The graphic controller 1075 obtains image data that the CPU 1000 and the like generate on a frame buffer in the RAM 1020, and displays it on a display 1080. Instead, the graphic controller 1075 may have therein the frame buffer to store the image data generated by the CPU 1000 and the like.

The input/output controller 1084 connects the host controller 1082 to the communication interface 1030 which is a relatively high-speed input/output device, the memory apparatus 20, and the CD-ROM drive 1060. The communication interface 1030 communicates with an external device via a network. The memory apparatus 20 stores programs and data that the computer 10 uses. The memory apparatus 20 may be a volatile memory device, for example, a flash memory or a hard disk drive. The CD-ROM drive 1060 reads programs or data from the CD-ROM 1095 and provides them to the RAM 1020 or the memory apparatus 20.

The input/output controller 1084 connects to the ROM 1010 and relatively low-speed input/output devices including the flexible disk drive 1050 and the input/output chip 1070. The ROM 1010 stores a boot program executed by the CPU 1000 to start the computer 10, programs that depend on the hardware of the computer 10, and so on. The flexible disk drive 1050 reads a program or data from the flexible disk 1090, and provides it to the RAM 1020 or the memory apparatus 20 via the input/output chip 1070. The input/output chip 1070 connects to the flexible disk 1090 and various input/output devices via, for example, a parallel port, a serial port, a keyboard port, and a mouse port.

Programs for the computer 10 are stored in a recording medium such as the flexible disk 1090, the CD-ROM 1095, or an IC card and are provided to the user. The programs are read from the recording medium via the input/output chip 1070 and/or the input/output controller 1084, and are installed into the computer 10 for execution. The programs may be executed by the CPU 1000 or the microcomputer in the memory apparatus 20 to control the components of the memory apparatus 20. The foregoing programs may be stored in external storage media. Examples of the storage media are, in addition to the flexible disk 1090 and the CD-ROM 1095, optical record media such as DVDs and PDs, magnetooptical record media such as MDs, tape media, and semiconductor memories such as IC cards.

While the embodiment uses the computer 10 as a system equipped with the memory apparatus 20 as an example, the memory apparatus 20 may be provided to any other units or systems. The memory apparatus 20 may be provided to portable or mobile units such as USB memory devices, portable phones, PDAs, audio players, and car navigation systems or desktop units such as file servers and network attached storages (NASs).

Figure 2:
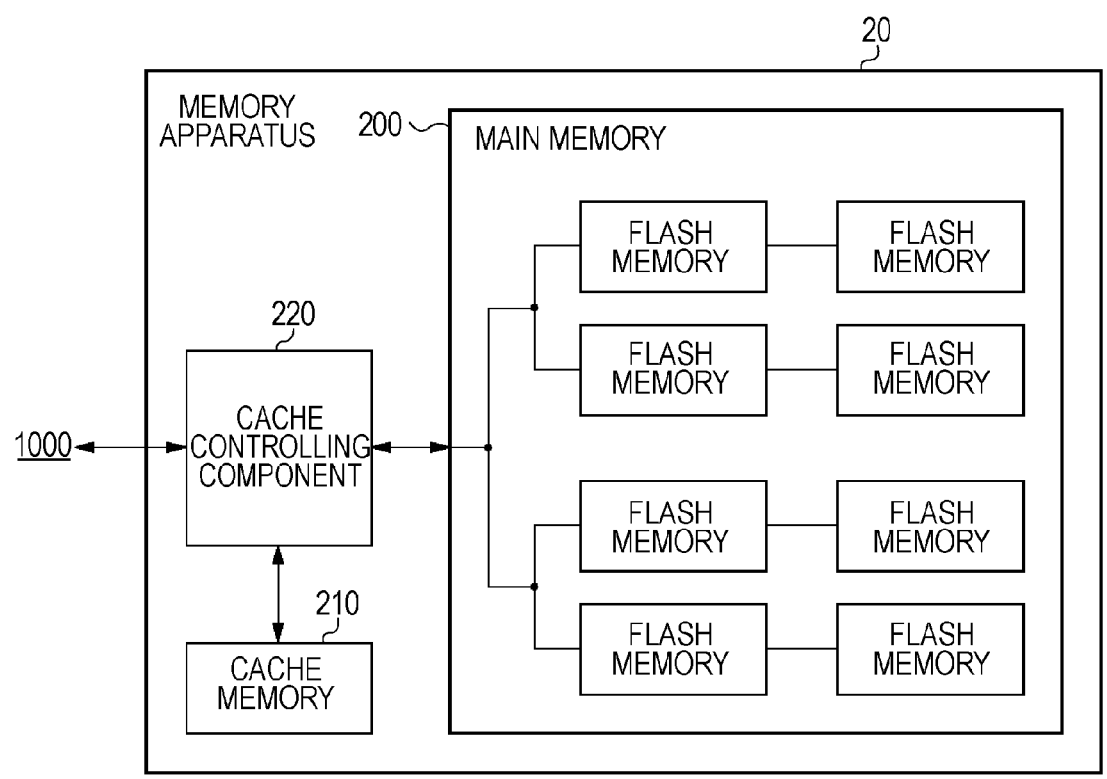
FIG. 2 shows an example of the hardware structure of a memory apparatus 20 according to the embodiment.

FIG. 2 shows an example of the hardware structure of the memory apparatus 20 according to this embodiment. The memory apparatus 20 includes a main memory 200, a cache memory 210, and a cache controlling component 220. The main memory 200 is a nonvolatile memory medium capable of holding stored contents even if the power supply to the computer 10 is shut off. Specifically, the main memory 200 may include at least one flash memory. Instead of or in addition to that, the main memory 200 may include at least one of a hard disk drive, a magnetooptical disk drive and an optical disk, and a tape drive and a tape. In the case where the main memory 200 includes a flash memory, it is desirable that the number of flash memories is two or more. This can increase not only the memory capacity of the main memory 200 but also the throughput of data transfer by bank interleaving.

The cache memory 210 is a volatile storage medium that loses its memory contents when the power source of the computer 10, for example, is shut off. Specifically, the cache memory 210 may be an SDRAM. The cache controlling component 220 receives a request to access the main memory 200 from the CPU 1000. More specifically, the cache controlling component 220 receives a request that is output from the input/output controller 1084 according to the instruction of a program that operates on the CPU 1000. This request may comply with a protocol for transferring the request to the hard disk drive, such as an AT attachment (ATA) protocol or a serial ATA protocol. Instead, the cache controlling component 220 may receive the request in accordance with another communication protocol.

When the request received is a read request, the cache controlling component 220 checks if the requested data is stored in the cache memory 210. If it finds the data stored in the cache memory, the cache controlling component 220 reads the data and sends a reply to the CPU 1000. If it does not, the cache controlling component 220 reads the data from the main memory 200 and sends a reply to the CPU 1000. When the received request is a write request, the cache controlling component 220 checks if a cache segment for storing the write data has already been assigned to the cache memory 210. If it finds the segment already assigned, the cache controlling component 220 stores the write data there. The cache segment storing the write data is written back to the main memory 200 if predetermined conditions are met. On the other hand, if it finds no segment assigned, the cache controlling component 220 assigns a new cache segment in order to store the write data. The objective of the embodiment is to solve the significant problems of this data cache technique which arise when a flash memory is used as the main memory 200, thereby enabling efficient access to the memory apparatus 20. Specific descriptions will be given hereinbelow.

Figure 3:
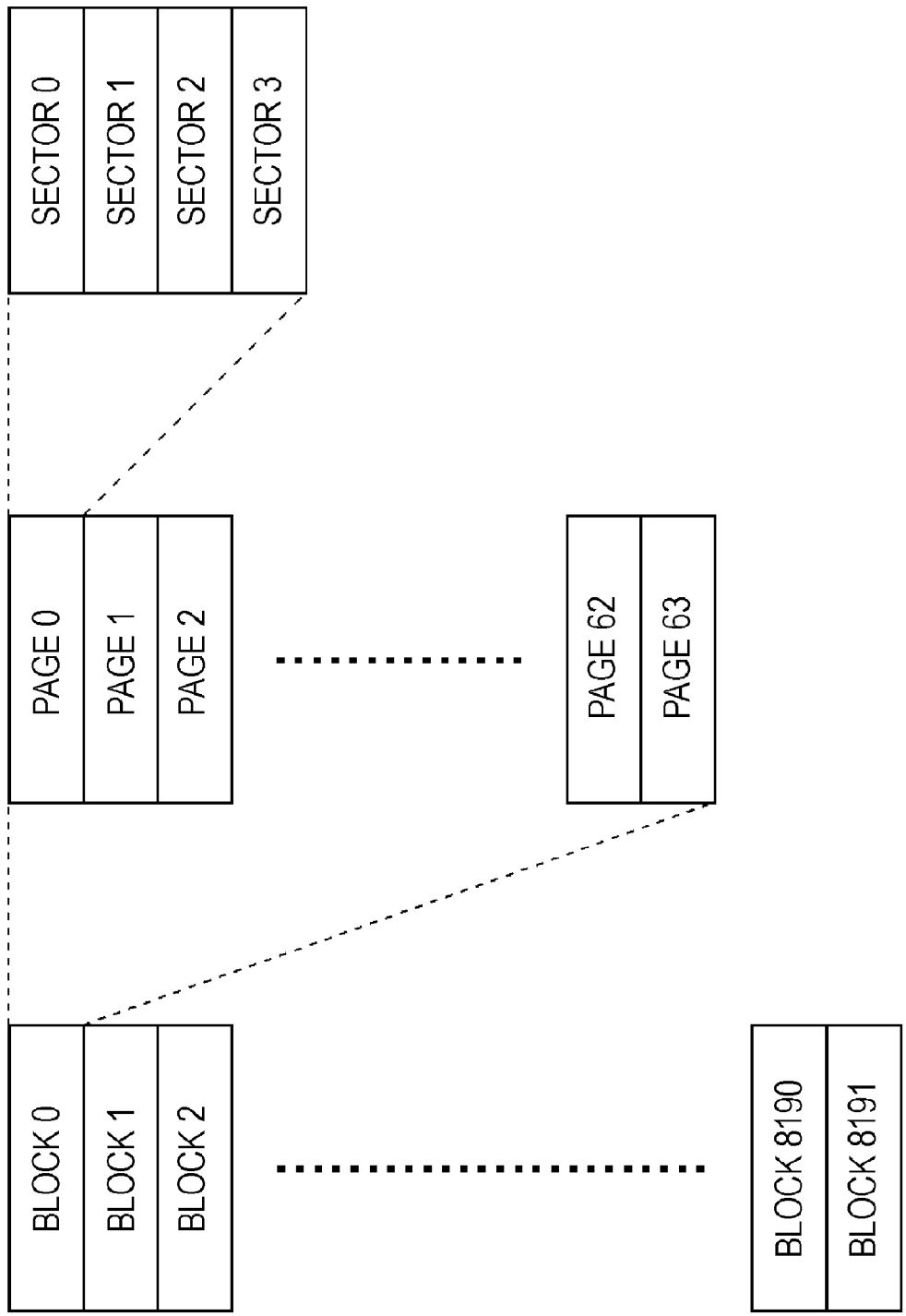
FIG. 3 shows an example of the data structure of a main memory 200 according to the embodiment.

FIG. 3 shows an example of the data structure of the main memory 200 according to this embodiment. The main memory 200 has, for example, 8,192 memory blocks. The memory block is a unit of data written to the main memory 200. That is, even if the size of the write data is smaller than that of the block, the write operation must be done on a block basis. If this is the case, all the data corresponding to the block are read from the main memory 200, updated with the write data, and written back to the main memory 200.

Some flash memories have a capability whereby the data change from zero to one or one to zero can be performed in a unit smaller than the block. However, it is extremely rare that data writing is achieved only by such changes. Therefore, it is necessary to write data to the memory block after the data of the entire memory blocks has been erased with the exception of such a rare case. Data is erased on a memory block basis. Therefore, data writing is also often made substantially on a memory block basis. Thus, writing and erasing can be considered to be the same in this embodiment, although their concept and unit are different in the strict sense. Accordingly, a process called "write" or "write back" in this embodiment includes the process of erasing unless otherwise specified.

The memory blocks each include, for example, 64 pages. The page is the unit of data reading. For example, one page in a flash memory has 2,112 bytes (2,048 bytes+64 bytes of a redundant section). The redundant section is an area for storing an error correcting code or an error detecting code.

Although a read can be achieved in a unit smaller than a write, the unit of reading has a certain degree of size in practice. Therefore, it is desirable to read data of a certain degree of size in a lump. A read-only cache memory may be provided in the main memory 200 to increase the read efficiency. Also in that case, it is desirable that the read data have consecutive addresses. The page is also the unit of writing without erasing. However, as has been described, such writing without erasing cannot achieve substantially efficient writing. Therefore, writing in the following description is accompanied by erasing, and its unit is a memory block.

One page includes four sectors. The sector is fundamentally the memory unit of a hard disk drive used in place of the memory apparatus 20. In this embodiment, since the memory apparatus 20 is operated as if it is a hard disk drive, the memory apparatus 20 has a memory unit of the same size as a sector of the hard disk drive. In this embodiment, the memory unit is referred to as a sector. For example, one sector contains 512-bytes of data. Although the terms, block, page, and sector indicate a memory unit or storage area, they are also used to indicate data stored in the area for simplification of expression.

Although the main memory 200 has the above internal structure, it is desirable that it be accessible from an external device in the unit of sectors for compatibility with the interface of the hard disk drive. For example, the main memory 200 may receive a read command to read data from Q sectors from the $P^{th}$ sector. Parameters P and Q may be set in each command. Even if the main memory 200 can accept such commands, the processing speed corresponding thereto depends on the internal structure. For example, a command to read a plurality of consecutive sectors is faster in processing speed per sector than a command to read only one sector. This is because reading is achieved in the unit of pages in view of the internal structure.

Figure 4:
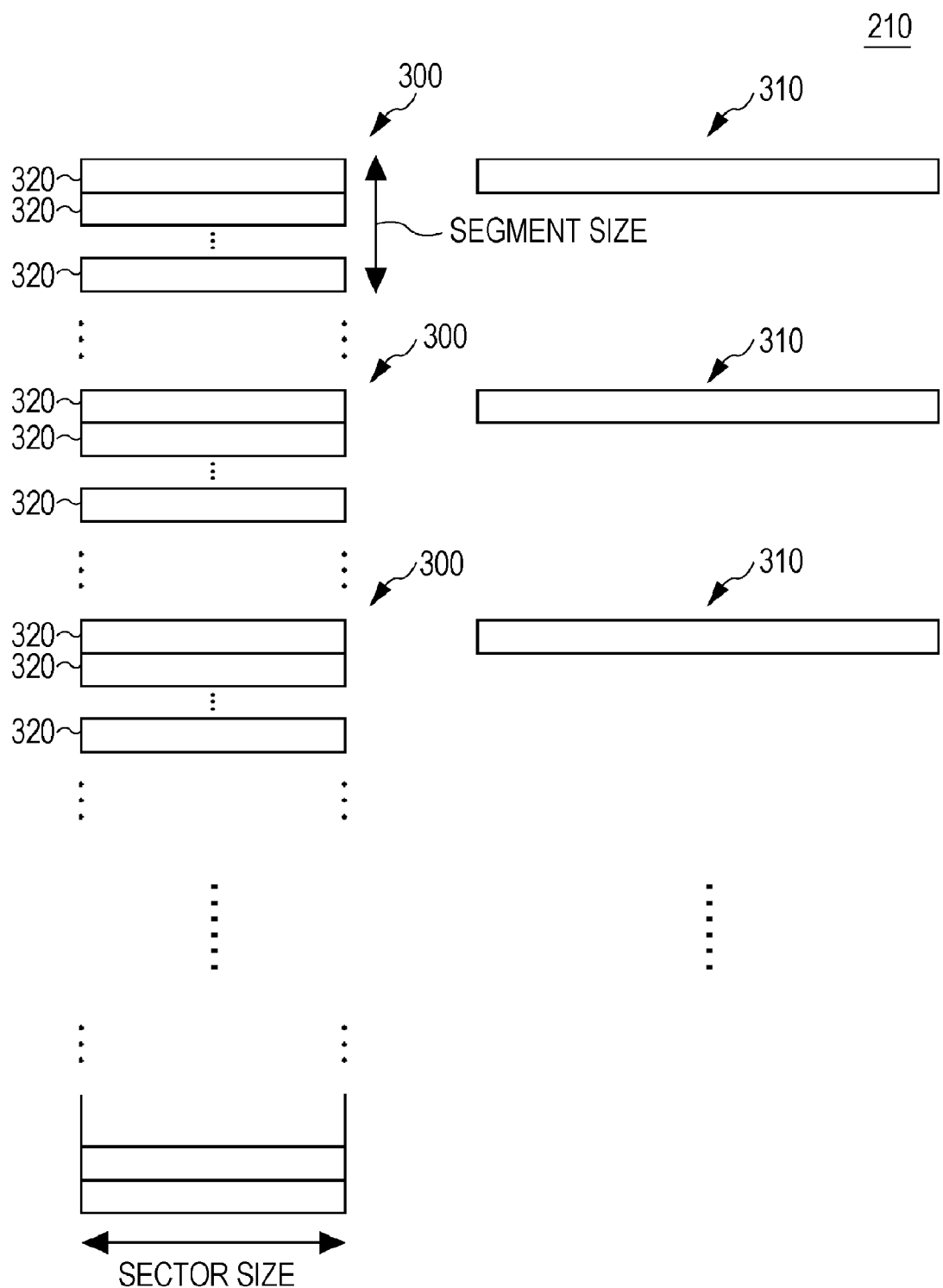
FIG. 4 shows an example of the data structure of a cache memory 210 according to the embodiment.

FIG. 4 shows an example of the data structure of the cache memory 210 according to this embodiment. The cache memory 210 has a plurality of segments 300. The cache memory 210 stores tag information 310 indicative of the respective attributes of the segments 300. The segments 300 each have a plurality of sectors 320. The sectors 320 are areas each having the same storage capacity as that of the sectors in the memory apparatus 20. The segment 300 can be assigned to at least part of the memory blocks of a data size larger than the cache segment. The assigned segments 300 read and store data in advance that is stored in part of the corresponding memory blocks to increase the efficiency of the following read processing. Instead, the assigned segments 300 may temporarily store data to be stored in part of the corresponding memory blocks to write them in a lump thereafter.

Figure 5:
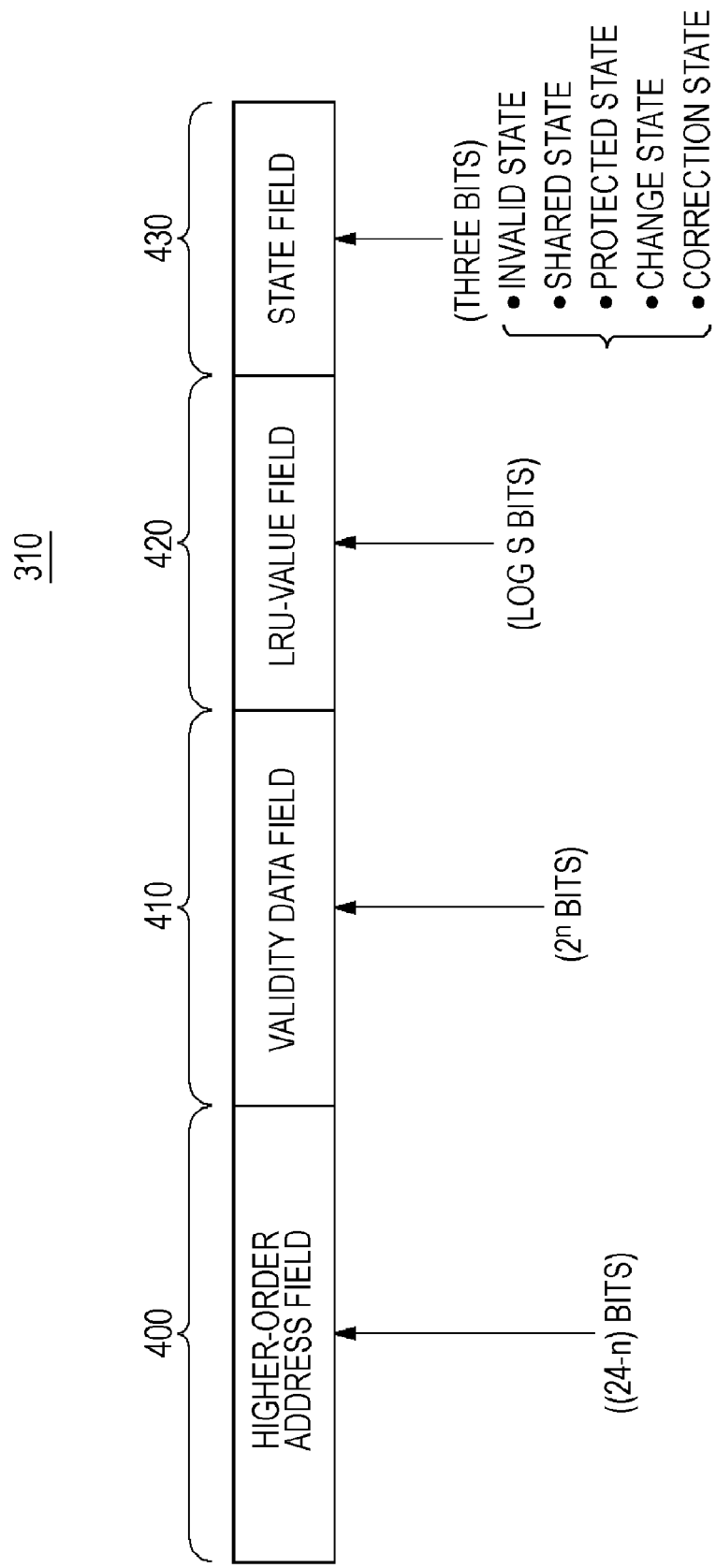
FIG. 5 shows an example of the data structure of tag information 310 according to the embodiment.

FIG. 5 shows an example of the data structure of the tag information 310 according to this embodiment. The cache memory 210 includes, as data fields for storing the tag information 310, a higher-order address field 400, a validity data field 410, an LRU-value field 420, and a state field 430. The higher-order address field 400 stores address values of predetermined digits from the highest order of the address values of the block in the main memory 200 to which a corresponding cache segment 300 is assigned. For example, when the addresses in the main memory 200 are expressed in 24 bits, the higher (24−n) bit address values other than the lower n bits are stored in the higher-order address field 400. These address values are referred to as higher-order addresses or higher-order address values. Addresses other than the higher-order addresses are referred to as lower-order addresses or lower-order address values.

When the higher-order address values are expressed as (24−n) bits and each sector can be defined uniquely by a lower-order address value, the number of the sectors 320 contained in one cache segment 300 is the $n^{th}$ power of 2. Accordingly, information of whether or not each sector 320 contained in one cache segment 300 is a valid sector containing valid data can be expressed by $2^n$ bits. This information is referred to as validity data. The validity data field 410 stores the validity data. The LRU-value field 420 is a field for storing LRU values. The LRU value is an index indicative of an unused period as the name Least Recently Used suggests.

Specifically, the LRU value may indicate the unused period of a corresponding cache segment 300 from the longest to shortest or from the shortest to the longest. Here the "use" means that at least one of reading and writing by the CPU 1000 is executed. More specifically, when a plurality of cache segments 300 is arranged from the longest to the shortest or from the shortest to the longest, the upper limit of the LRU value is the number of the cache segments 300. Accordingly, the LRU-value field 420 that stores the LRU values needs bits corresponding to the logarithm of the number S of segments whose lower limit is 2.

The state field 430 stores states set for corresponding cache segments 300. The states are expressed in, for example, three bits. Each cache segment 300 is set to any of a plurality of states including an invalid state, a shared state, a protected state, a change state, and a correction state. The outline of the states is as follows: The invalid state indicates the state of the cache segment 300 in which all the contained sectors 320 are invalid sectors. The invalid sectors hold no data that matches the main memory 200 and no data requested from the CPU 1000 to be written to the main memory 200. In the initial state in which the computer 10 is started or the like, all the cache segments 300 are in the invalid state.

The shared state is a state of the cache segment 300 in which all the sectors 320 are shared sectors and are replaceable for writing. The shared sectors are valid sectors and hold data that matches the main memory 200. The protected state indicates the state of the segment 300 in which all the sectors 320 are shared sectors and are protected from writing. The change state and the correction state are states in which data that does not match the main memory 200 and is to be written to the main memory 200 is included. The cache segment 300 before being changed has data to be written to the main memory 200 in part of the sectors 320. In contrast, the cache segment 300 in the correction state has data to be written to the main memory 200 in all the sectors 320 thereof. Such sectors 320 are referred to as change sectors. The change sectors are valid sectors.

The technique of defining the state of cache segments for transition is known as, for example, an MSI protocol, an MESI protocol, and an MOESI protocol. For other examples and details, refer to those techniques.

Figure 6:
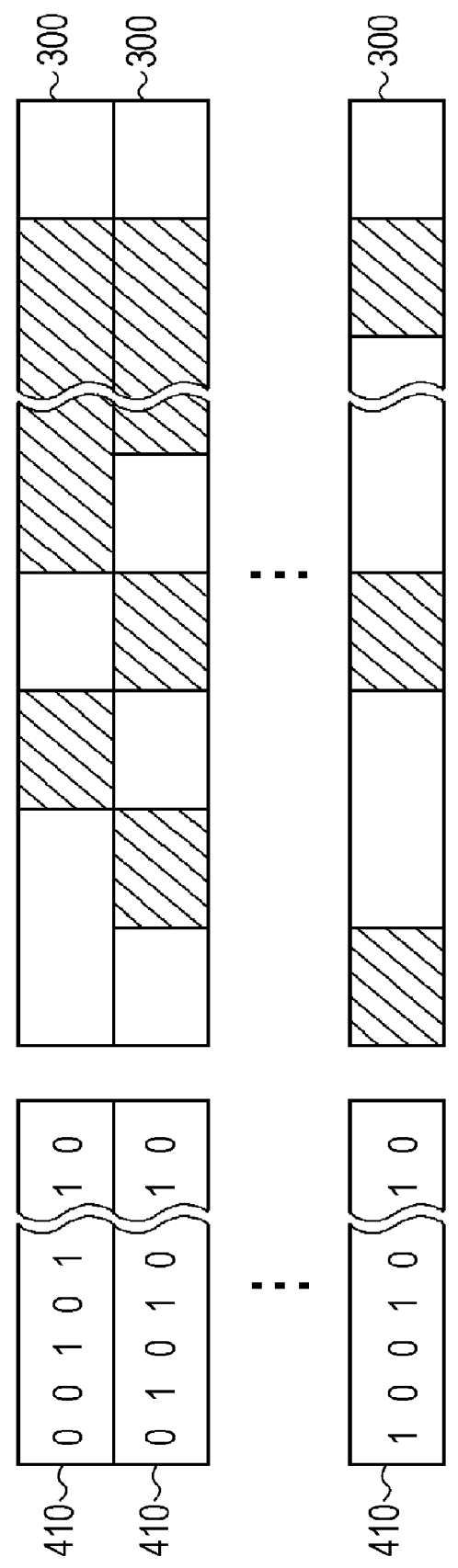
FIG. 6 shows concrete examples of a cache segment 300 and a validity data field 410 according to the embodiment.

FIG. 6 shows concrete examples of the cache segment 300 and the validity data field 410 according to this embodiment. As in the change state, part of the cache segments 300 sometimes has a valid sector. FIG. 6 shows valid sectors by hatch lines. Invalid sectors are not given hatch lines. Validity data stored in the validity data field 410 is a bit string in which logical values indicative of whether the sectors of a corresponding cache segment are valid or not are arrayed for each sector. For example, a logical value 1 indicates a valid sector, and a logical value 0 indicates an invalid sector. Validity data have such logical values arrayed in order of corresponding sectors.

As described above, the position of each sector in the cache segment is uniquely defined by the address of the sector. If a cache miss occurs in a write, it is preferable that write data be written to the cache memory 210 without reading data from the main memory 200 to the cache memory 210 from the viewpoint of decreasing access to the flash memory. Accordingly, if a number of writing requests is given to various addresses, the cache segment may sometimes have valid sectors and invalid sectors in an interleaved manner. In this case, validity data stored in the validity data field 410 have a logical value 1 and a logical value 0 discretely.

Figure 7:
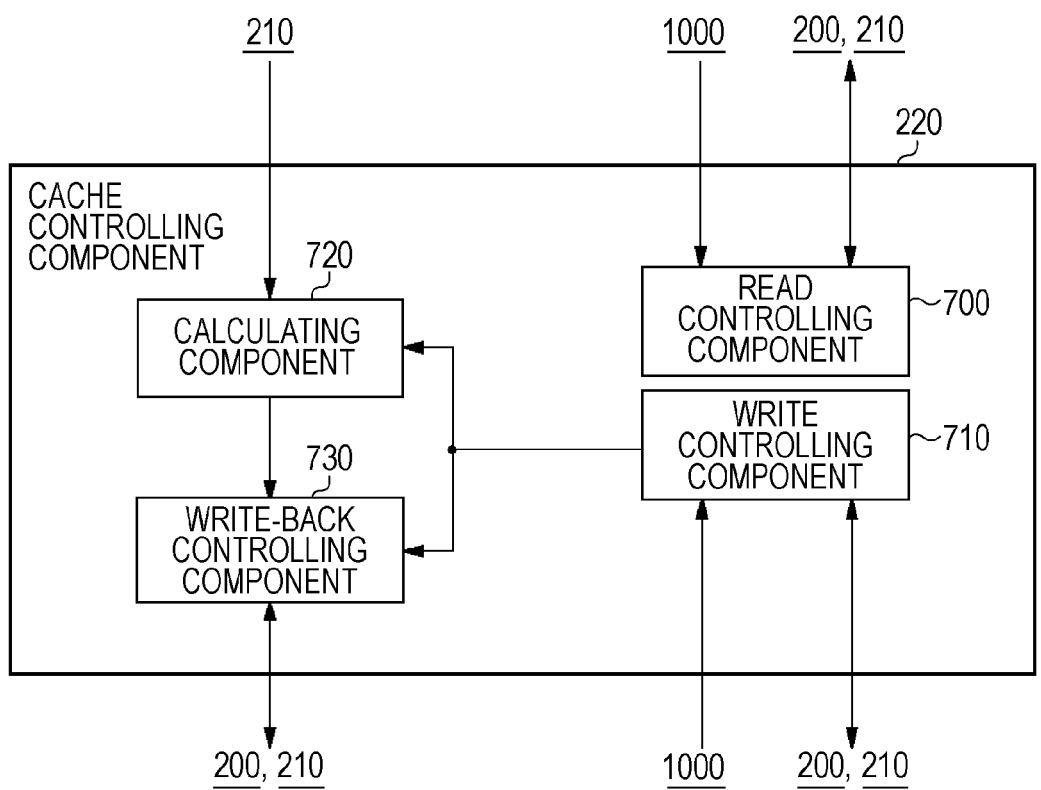
FIG. 7 shows the functional structure of a cache controlling component 220 according to the embodiment.

FIG. 7 shows the functional structure of the cache controlling component 220 according to the embodiment. The cache controlling component 220 has, as a basic function, the function of converting a communication protocol such as an ATA protocol to a command for accessing the main memory 200 such as a flash memory and transmitting it to the main memory 200. In addition, the cache controlling component 220 acts to improve the function of the whole memory apparatus 20 by controlling access to the cache memory 210. Specifically, the cache controlling component 220 includes a read controlling component 700, a write controlling component 710, a detecting component 720, and a write-back controlling component 730. The foregoing components may be achieved by various LSIs such as a hard-wired logic circuit and a programmable circuit, or may be achieved by a microcomputer that executes a program that is read in advance.

The read controlling component 700 receives a data read request to sectors from the CPU 1000. When the reading hits a cache, the read controlling component 700 reads the data from the cache memory 210 and sends a reply to the CPU 1000. If the reading misses a cache, the read controlling component 700 reads a page containing the data from the main memory 200 and stores it in the cache memory 210, and sends the data to the CPU 1000. The determination of whether there is a cache hit or a cache miss is made by comparing the higher-order address of the address to be read with the higher-order address field 400 corresponding to each cache segment 300. If a corresponding higher-order address is present, it is determined to be a cache hit, while if no corresponding higher-order address is present, it is determined to be a cache miss. If the sector to be read is an invalid sector even if a corresponding higher-order address is present, it is determined to be a cache miss.

The write controlling component 710 receives a data write request to sectors from the CPU 1000. When the writing misses a cache, the write controlling component 710 assigns a new cache segment to cache the write data. The determination of whether there is a cache hit or a cache miss is similar to that of reading. That is, if a corresponding higher-order address is present, it is determined to be a cache hit, while if no corresponding higher-order address is present, it is determined to be a cache miss. However, unlike reading, even writing to an invalid sector is determined to be a cache hit, and the write data is stored in the sector on the cache. Assignment of a cache segment is achieved by storing the higher-order address of the addresses to be written to the higher-order address field 400 corresponding to the cache segment 300 to be assigned. Selection of a segment 300 to be assigned is made according to the state of each cache segment 300.

For example, if a segment 300 in an invalid state is present, the segment 300 is selected, and if a segment 300 in an invalid state is absent, a segment 300 in a shared state is selected. If there are two or more segments 300 in the same state, a segment 300 with the longest unused period indicated by an LRU value is selected therefrom. If there is no appropriate segment 300 to be selected, the write controlling component 710 instructs the write-back controlling component 730 to write a specified segment 300 back to the main memory 200, and selects the segment 300 for use as a new segment 300. The write controlling component 710 writes the write data to the sectors in the new segment 300, and sets validity data corresponding to the sectors other than the target sectors invalid.

On the other hand, if writing to one sector hits a cache, the write controlling component 710 writes the write data to the sector in the segment 300 assigned to cache the write data to the sector. The write controlling component 710 sets validity data corresponding to the sector valid. The written data is written back to the main memory 200 by the write-back controlling component 730 when there is no new segment 300 to be assigned or specified conditions are met.

The detecting component 720 starts processing when writing a segment 300 back to the main memory 200, and accesses validity data corresponding to the segment 300 to detect an area of consecutive invalid sectors. For example, the detecting component 720 detects a plurality of consecutive invalid sectors having no valid sectors in between as an area of consecutive invalid sectors. In addition, the detecting component 720 may detect one invalid sector between valid sectors as the area. The write-back controlling component 730 issues a read command to read data into each detected area to the main memory 200 and makes the areas valid sectors. To the read command, a reading range, for example, a sector position to start reading and the number of sectors to be read, can be set. That is, reading commands may be issued by the number of areas not the number of invalid sectors. The write-back controlling component 730 writes the data in the segment 300 filled with valid sectors back to the main memory 200.

Figure 8:
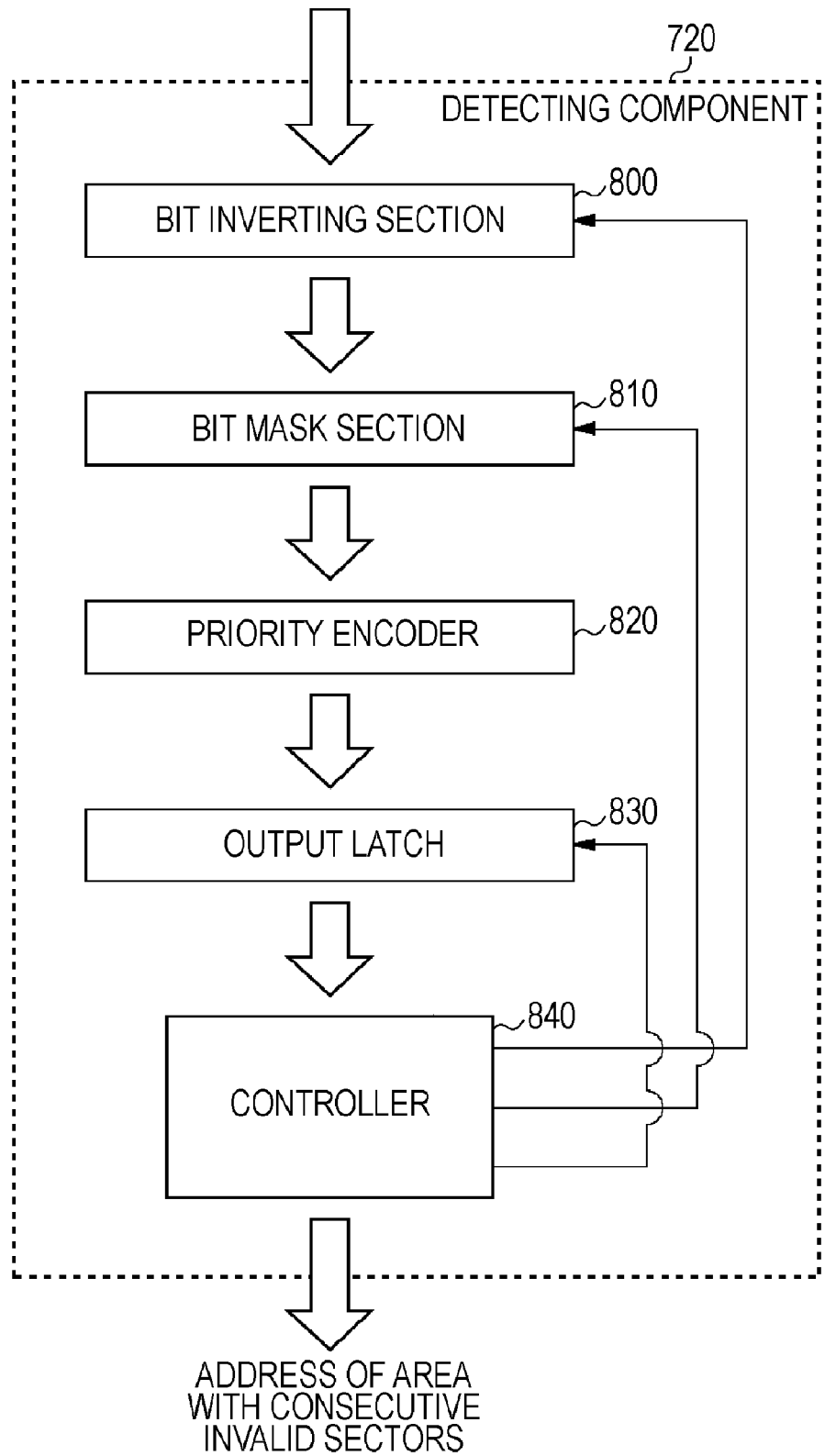
FIG. 8 is a conceptual diagram of the circuit structure of a detecting component 720 according to the embodiment.

FIG. 8 is a conceptual diagram of the circuit structure of the detecting component 720 according to the embodiment. The detecting component 720 includes a bit inverting section 800, a bit mask section 810, a priority encoder 820, an output latch 830, and a controller 840. The bit inverting section 800 inputs validity data read from the cache memory 210. The validity data to be input corresponds to one segment 300. Instead, the bit inverting section 800 may input continuous validity data corresponding to a predetermined number of segments 300. Both validity data that the bit inverting section 800 input are simply referred to as validity data for the convenience of description.

The bit inverting section 800 inverts or does not invert the bits of the validity data according to its setting, and outputs them. For example, the bit inverting section 800 may be an XOR operating unit. The bit mask section 810 inputs the validity data output from the bit inverting section 800, wherein if a mask pattern is set, the bit mask section 810 masks the validity data with the mask pattern, and if no mask pattern is set, the bit mask section 810 outputs the validity data unchanged. For example, the bit mask section 810 may be an AND operating unit.

The priority encoder 820 detects the highest-order bit whose logical value is true from the validity data output from the bit mask section 810, and outputs its bit position. The output latch 830 stores the output bit position, and outputs the information on the bit position to the controller 840 at a predetermined timing. The controller 840 inputs the bit position that is output from the priority encoder 820 and stored in the output latch 830. The controller 840 changes the setting of the bit inverting section 800 every time a bit position is input, and sets a mask pattern to the bit mask section 810, for masking the bit string from the highest-order bit to the input bit position.

As the setting is changed, the outputs of the bit inverting section 800 and the bit mask section 810 are changed, and another bit position is stored in the output latch 830. In response to that, the controller 840 further changes the setting. The controller 840 repeats the setting changing process until no bit position is output from the priority encoder 820. The detecting component 720 detects the bit positions that are output from the output latch 830 in sequence as the boundary between an area of consecutive invalid sectors and valid sectors. The details of the process of the detecting component 720 will be described later using an example with reference to FIGS. 13 to 17.

Figure 9:
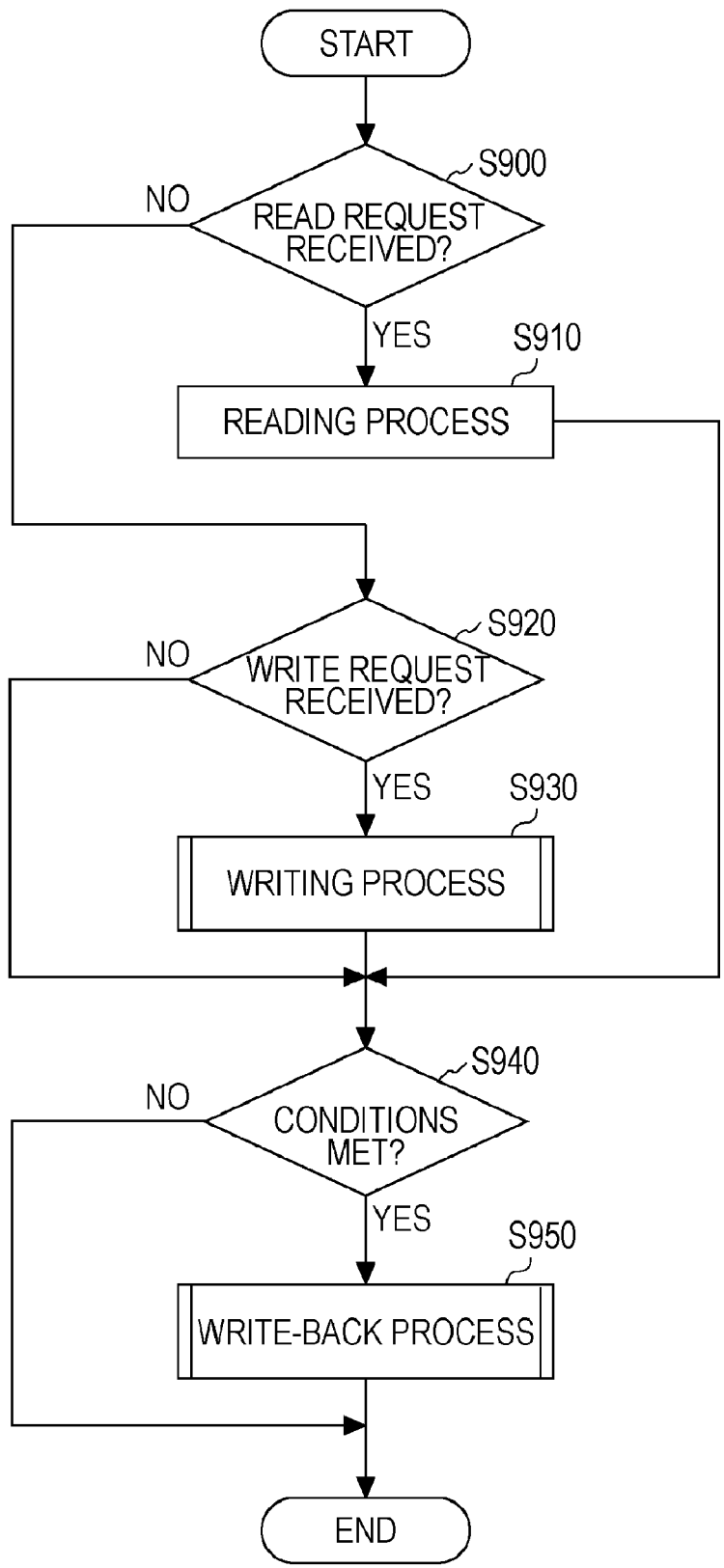
FIG. 9 shows the process flow of the cache controlling component 220 according to the embodiment in response to requests from a CPU 1000.

FIG. 9 shows the flow of the processing of the cache controlling component 220 of the embodiment in response to requests from the CPU 1000. Upon reception of a data read request to sectors from the CPU 1000 (S900: YES), the read controlling component 700 executes a reading process (S910). For example, if the reading hits a cache, the read controlling component 700 reads the data from the cache memory 210 and sends the data to the CPU 1000. If the reading misses a cache, the read controlling component 700 reads a page containing the data from the main memory 200, stores it in the cache memory 210, and sends the data to the CPU 1000.

Upon reception of a data write request to sectors from the CPU 1000 (S920: YES), the write controlling component 710 executes a writing process (S930). The details will be described later with reference to FIG. 10. If predetermined conditions are met (S940), the detecting component 720 and the write-back controlling component 730 write a segment 300 having both valid sectors and invalid sectors back to the main memory 200 (S950). For example, the detecting component 720 and the write-back controlling component 730 select a segment 300 containing valid sectors and invalid sectors under the condition that the proportion of segments 300 containing both valid sectors and invalid sectors of the segment 300 in the cache memory 210 has exceeded a predetermined reference value, and writes it back to the main memory 200. It is desirable that the selection of the segment 300 is based on the LRU value. This secures a new segment 300 that can be assigned before the occurrence of a cache miss, thus reducing the time for processing at the occurrence of a cache miss.

Figure 10:
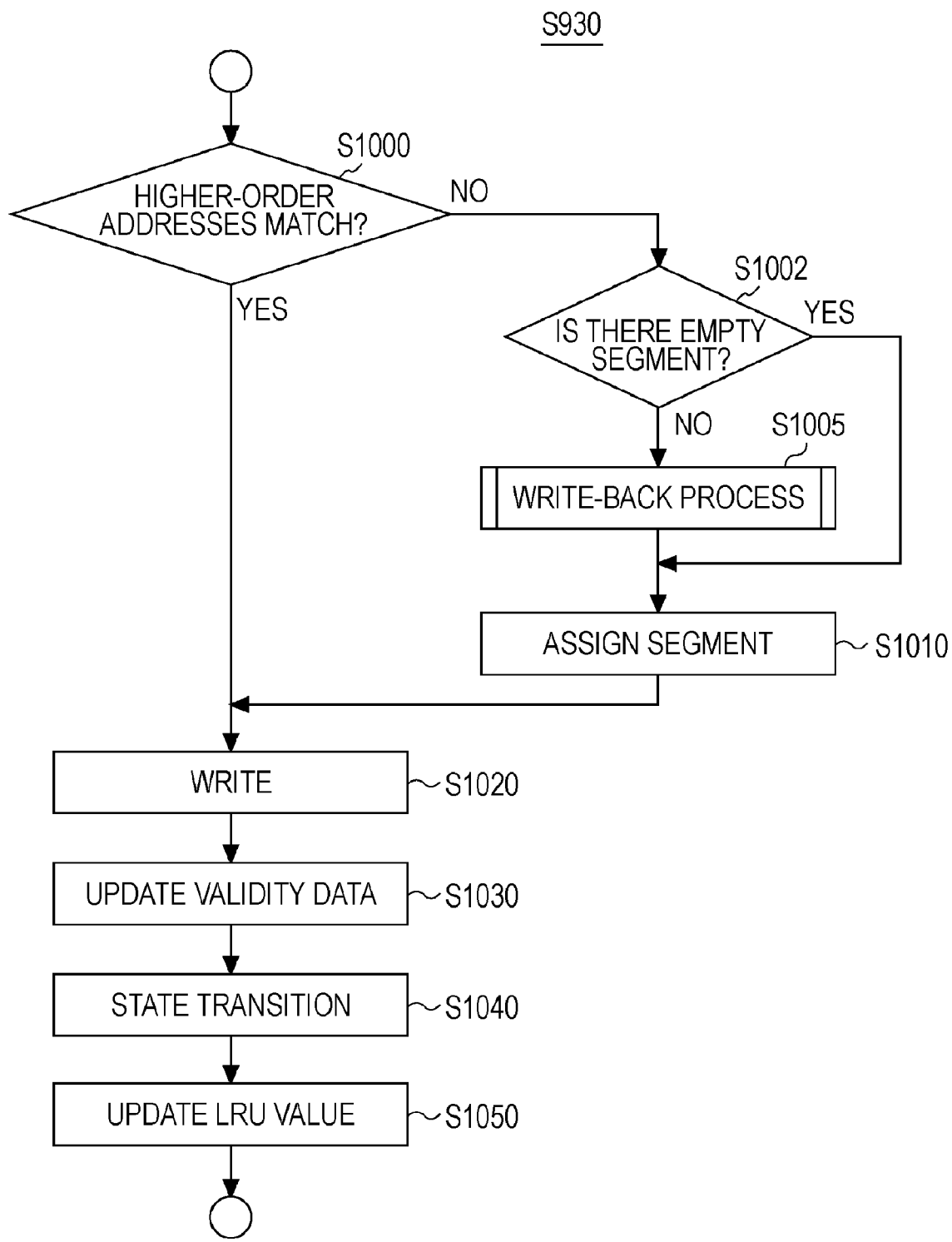
FIG. 10 shows the details of the process in step S930.

FIG. 10 shows the details of the process in step S930. The write controlling component 710 determines whether the higher-order address of the address to which a write request is given matches a higher-order address stored in any of the higher-order address fields 400 (S1000). If they do not match (in the case of a cache miss, S1000: NO), the write controlling component 710 determines whether there is a new segment 300 that can be assigned to cache the write data (S1002). For example, the write controlling component 710 scans the state fields 430 to search for a segment 300 in an invalid state or in a shared state. This is because such segments 300 are reusable for another purpose without being written back to the main memory 200. If a segment 300 in any of the states is found, it is determined that a newly assignable segment 300 is present.

If there is no newly assignable segment 300 (S1002: NO) available, the write controlling component 710 executes the process of writing a segment 300 containing valid sectors and invalid sectors back to the main memory 200 (S1005). The write controlling component 710 assigns a new segment 300 to cache the write data (S1010). After the segment 300 is assigned or at a cache hit in which higher-order addresses match (S1000: YES), the write controlling component 710 stores the write data in the newly assigned segment 300 or the segment 300 in which the higher-order addresses match (S1020). If data is written to the newly assigned segment 300, the write controlling component 710 sets validity data corresponding to sectors other than the target sector invalid (S1030). In the case of a cache hit, the write controlling component 710 sets the validity data corresponding to the written sector valid.

The write controlling component 710 may update a corresponding state field 430 so as to shift the state of the segment 300 to another state as necessary (S1040). The write controlling component 710 may update the LRU-value field 420 so as to change the LRU value corresponding to the write target segment 300 (S1050).

Figure 11:
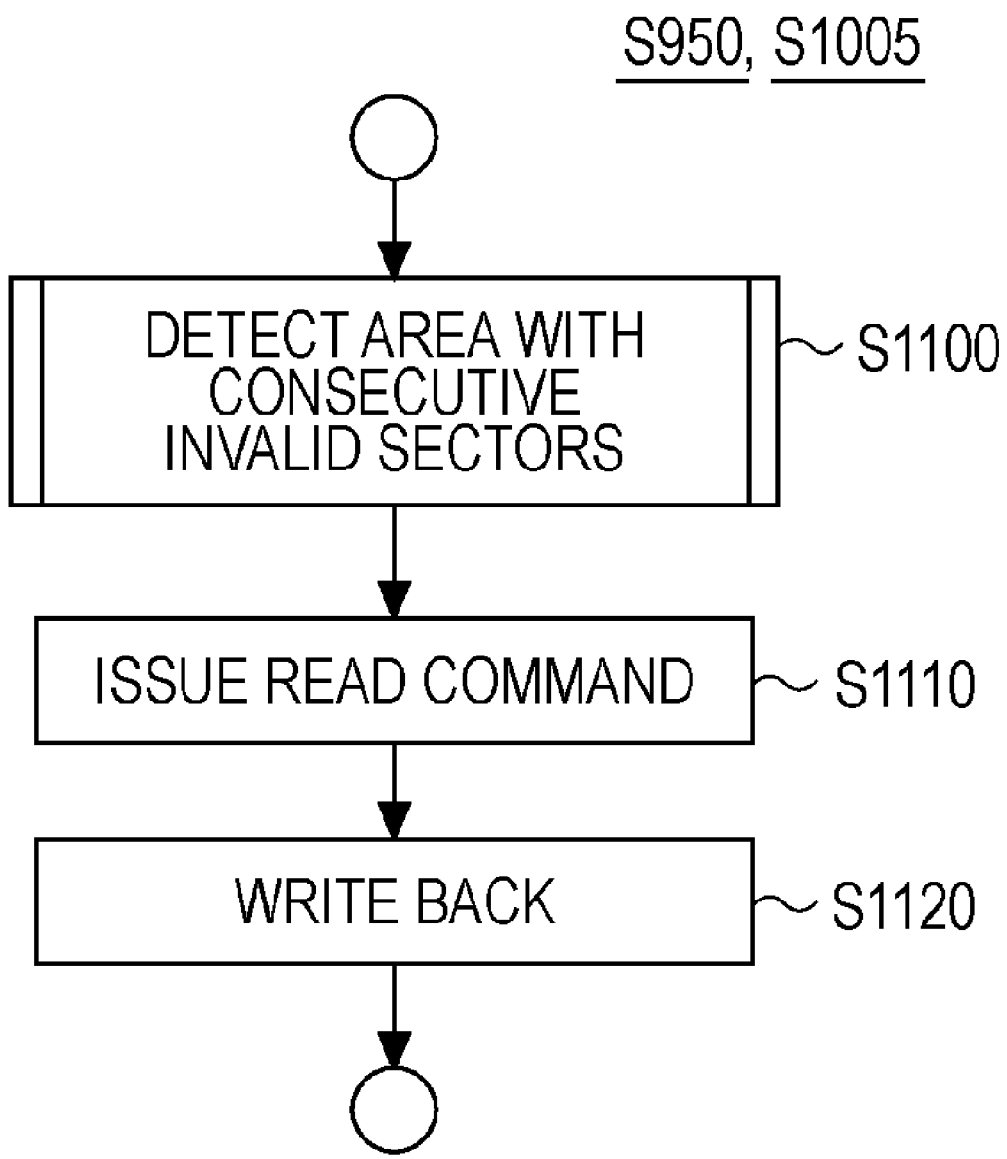
FIG. 11 shows the details of the processes in steps S950 and S1005.

FIG. 11 shows the details of the processes in steps S950 and S1005. The detecting component 720 starts processing with writing a segment 300 back to the main memory 200, and accesses validity data corresponding to the segment 300 to detect an area of consecutive invalid sectors (S1100). The write-back controlling component 730 issues a read command to read data into each detected area to the main memory 200 and makes the areas valid sectors (S1110). The write-back controlling component 730 writes the data in the segment 300 filled with valid sectors back to the main memory 200 (S1120).

If one segment 300 is smaller in size than one memory block, the process of reading the other data in the memory block is also executed. For example, the write-back controlling component 730 reads the data corresponding to the other cache segment in the memory block from the main memory 200, and writes the segment to be written back and the read data back to the memory block.

Figure 12:
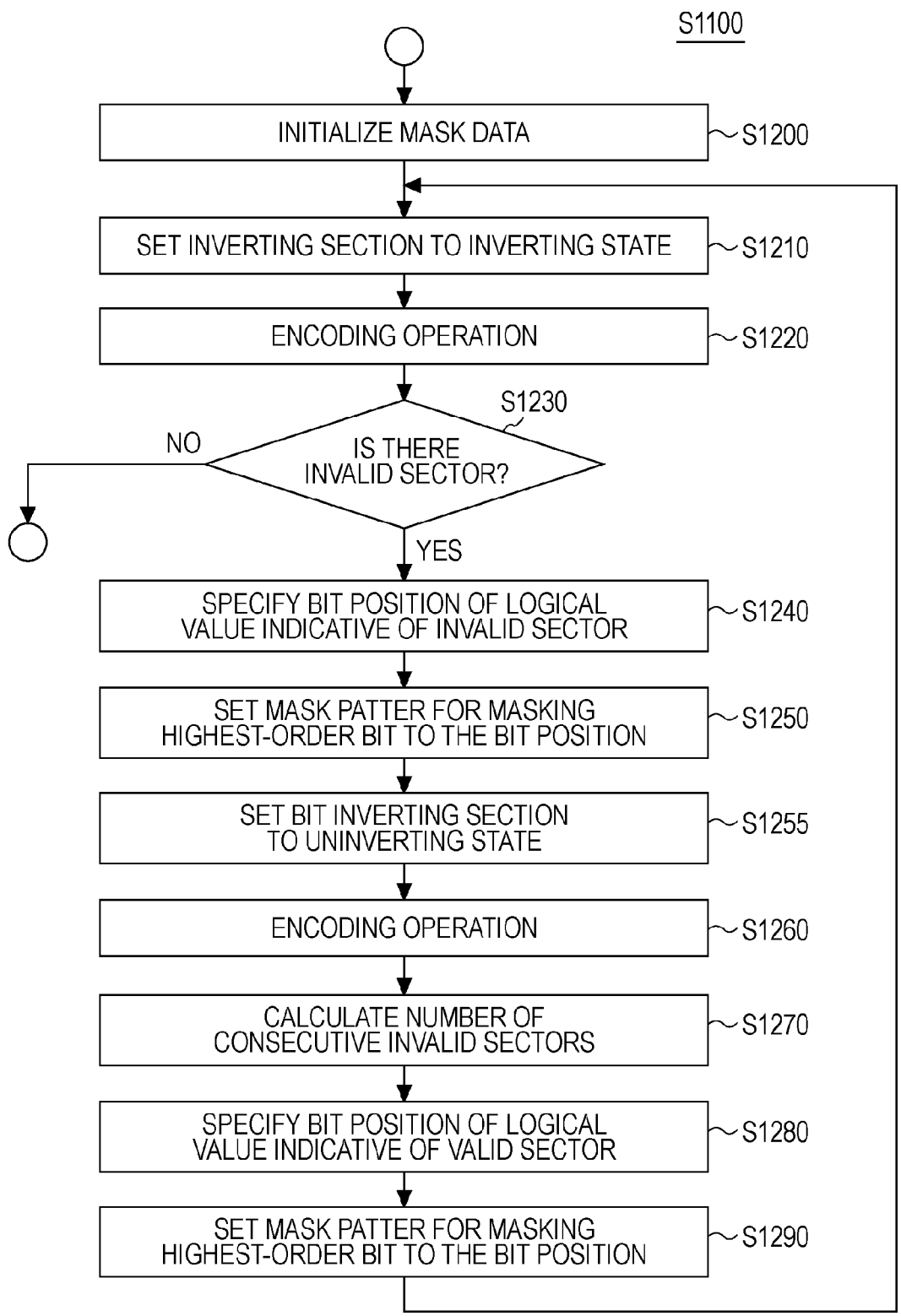
FIG. 12 shows the details of the process in step S1100.

FIG. 12 shows the details of the process in step S1100. First, the detecting component 720 initializes mask data to be set to the bit mask section 810 (S1200). At the initialization, the mask data is set to a bit string of which all the bits have a logical value 1 so that all the logical values are output as they are. Next, the detecting component 720 sets the setting of the bit inverting section 800 to an inverting state (S1210). That is, in the initial state, the bit inverting section 800 outputs the bits in an inverted state.

The detecting component 720 carries out an encoding operation (S1220). Specifically, the bit inverting section 800 outputs the bits of the validity data in an inverted state. The bit mask section 810 inputs the validity data output from the bit inverting section 800, masks the validity data with the set mask pattern, and outputs it. The priority encoder 820 detects the highest-order bit having a logical value of true from the validity data output from the bit mask section 810, and outputs the bit position thereof. The output latch 830 stores the output bit position.

The controller 840 determines whether an invalid sector is present according to the output bit position (S1230). For example, if the output bit position indicates a bit lower than the lowermost-order bit of the validity data or if it indicates that there is no bit of a logical value of true, the controller 840 determines that there is no invalid sector. If there is no invalid sector (S1230: NO), the controller 840 finishes the detection process shown in FIG. 12. In contrast, if an invalid sector is present (S1230: YES), the controller 840 specifies the bit position of the logical value indicative of the invalid sector, and stores it temporarily in the storage area (S1240). If the controller 840 has already input the bit position from the output latch 830, the bit position is a bit position to be specified.

The controller 840 generates a mask pattern to mask the bit string from the highest-order bit to the input bit position, and sets it to the bit mask section 810 (S1250). The controller 840 sets the bit inverting section 800 to a noninverting state (S1255), and then carries out an encoding operation (S1260). Specifically, the bit inverting section 800 outputs the bits of the validity data without inverting them. The bit mask section 810 inputs the validity data output from the bit inverting section 800, and masks the validity data with the set mask pattern, and outputs it. The priority encoder 820 detects the highest-order bit whose logical value is true from the validity data output from the bit mask section 810, and outputs its bit position.

The controller 840 calculates the number of consecutive invalid sectors from the output bit position and the bit position output at the last time (S1270). For example, the number of consecutive invalid sectors is obtained by subtracting the last bit position from the bit position output this time. The controller 840 specifies the bit position of the logical value indicative of a valid sector, and stores it temporarily in the storage area (S1280). If the controller 840 has already input the bit position from the output latch 830, the bit position is a bit position to be specified. The controller 840 generates a mask pattern to mask the bit string from the highest-order bit to the input bit position, and sets it to the bit mask section 810 (S1290). Then, the detecting component 720 returns to step S1210, and executes detecting process for the next area.

After repetition of the above processes, the bit positions that are temporarily stored in the storage area indicate the boundary between an area of consecutive invalid sectors and valid sectors. Concrete examples of the result of the processes will be described with reference to FIGS. 13 to 17. Assume that validity data is a 16-bit string for the purpose of simplification.

Figure 13:
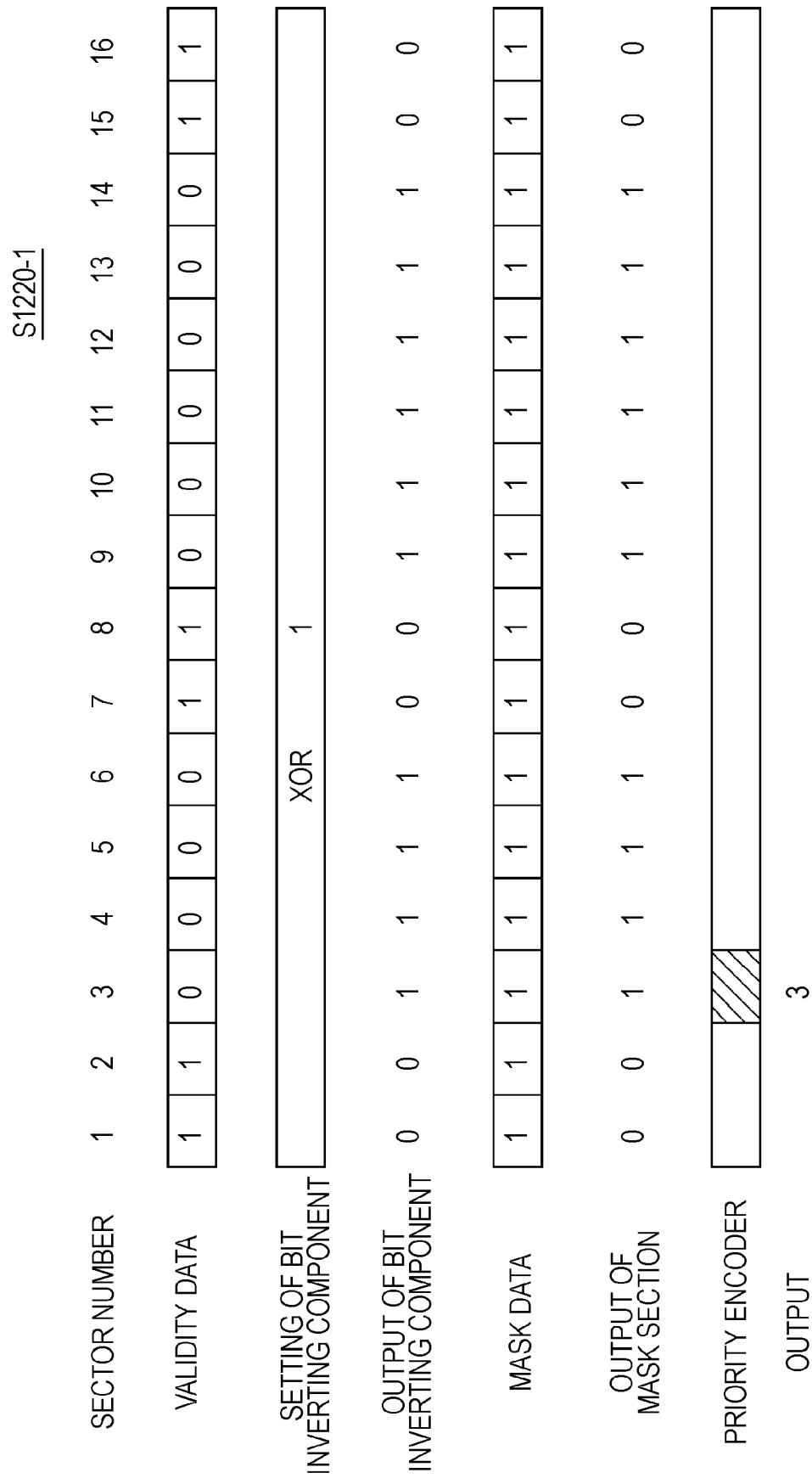
FIG. 13 shows the details of step S1220 (S1220-1) of the first cycle.

FIG. 13 shows the details of step S1220 (S1220-1) of the first cycle. In the first encoding operation of the first cycle, the bit inverting section 800 is set in an inverting state, and the bit mask section 810 is set to output all the bits as they are. If the validity data is "1100001100000011", the output of the bit inverting section 800 is inverted to "0011110011111100". The output of the bit mask section 810 is not changed. Accordingly, the priority encoder 820 outputs the highest-order bit position of a logical value 1, for example, a value 3 indicative of the third bit from the highest order bit.

FIG. 14 shows the details of step S1260 (S1260-1) of the first cycle. In the second encoding operation of the first cycle, the bit inverting section 800 is set in a noninverting state, and the bit mask section 810 is set to mask the highest three bits. If the validity data is "1100001100000011", the output of the bit inverting section 800 is also the validity data unchanged. The output of the bit mask section 810 is "0000001100000011". Accordingly, the priority encoder 820 outputs the highest-order bit position of a logical value 1, for example, a value 7 indicative of the seventh bit from the highest order bit.

The processes show that the area of the four bits from the third bit to the seventh bit is an area of consecutive invalid sectors. In this case, for example, the write-back controlling section 730 issues a read command to read data from the main memory 200 to the four sectors starting from the third sector of the segment 300.

Figure 15:
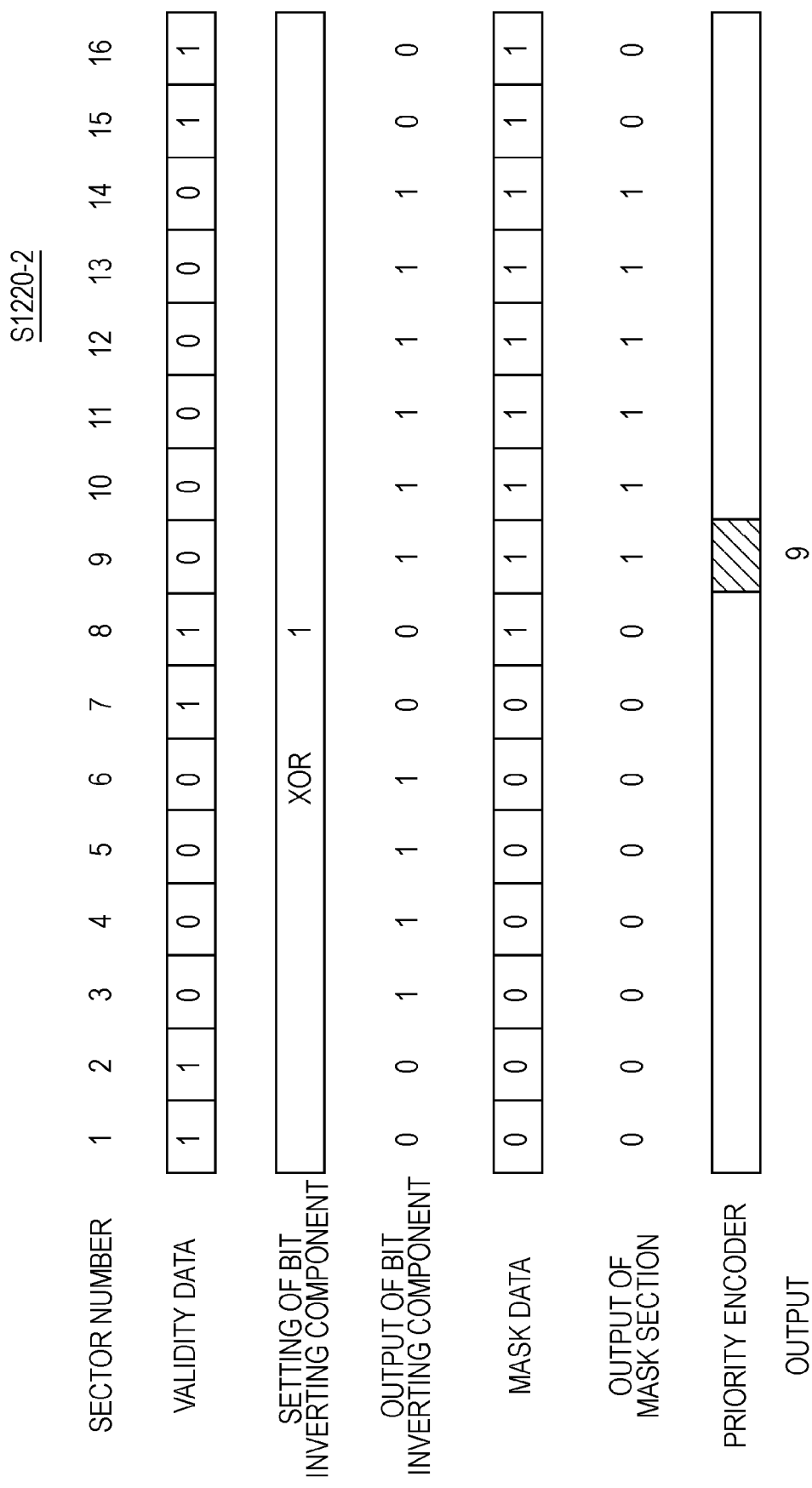
FIG. 15 shows the details of step S1220 (S1220-2) of the second cycle.

FIG. 15 shows the details of step S1220 (S1220-2) of the second cycle. In the first encoding operation of the second cycle, the bit inverting section 800 is set in an inverting state, and the bit mask section 810 is set to mask the highest-order seven bits. If the validity data is "1100001100000011", the output of the bit inverting section 800 is inverted to "0011110011111100". The output of the bit mask section 810 becomes "0000000011111100". Accordingly, the priority encoder 820 outputs the highest-order bit position of a logical value 1, for example, a value 9 indicative of the ninth bit from the highest order bit.

Figure 16:
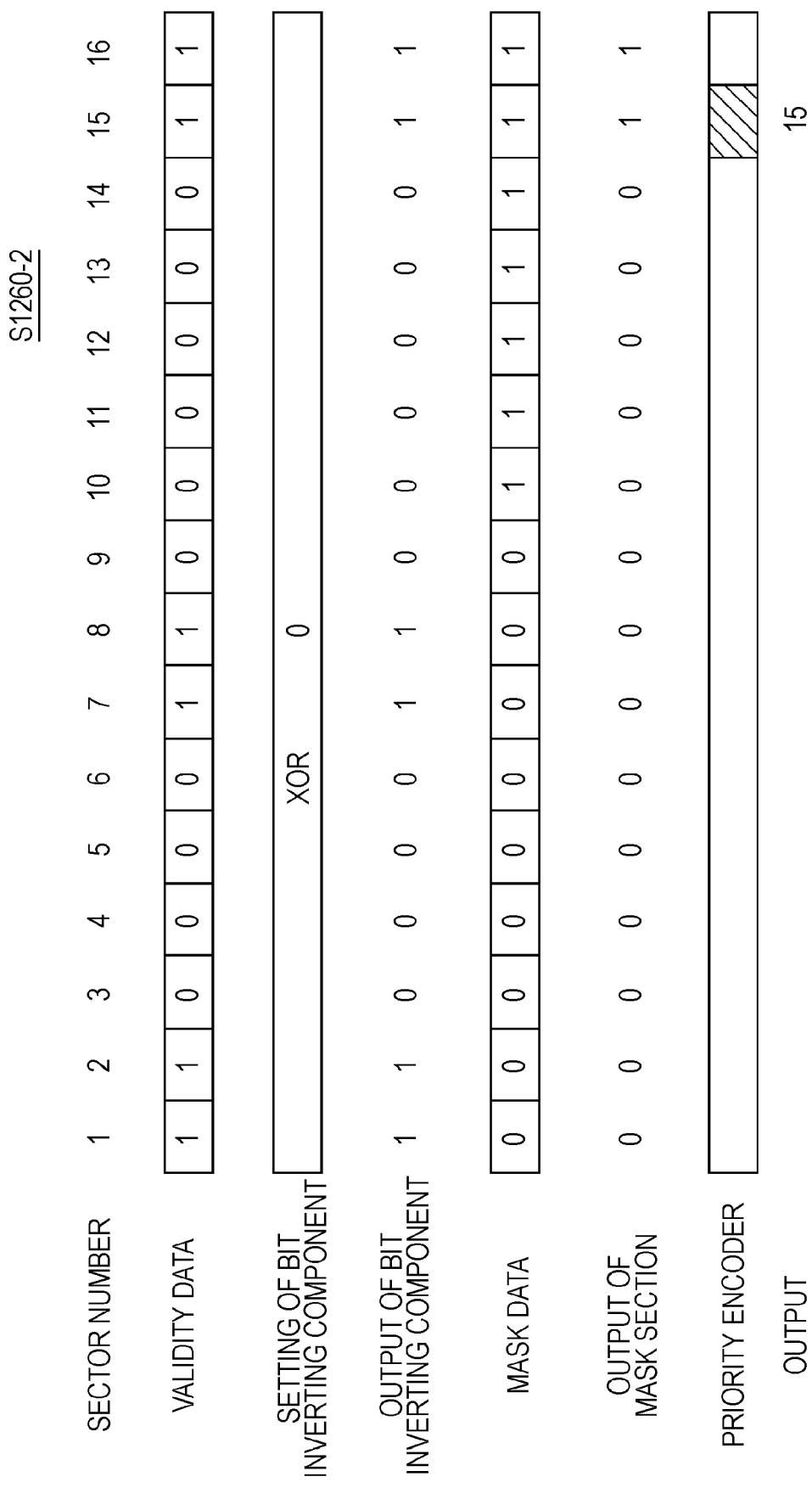
FIG. 16 shows the details of step S1260 (S1260-2) of the second cycle.

FIG. 16 shows the details of step S1260 (S1260-2) of the second cycle. In the second encoding operation of the second cycle, the bit inverting section 800 is set in a noninverting state, and the bit mask section 810 is set to mask the highest nine bits. If the validity data is "1100001100000011", the output of the bit inverting section 800 is also the validity data unchanged. The output of the bit mask section 810 is "0000000000000011". Accordingly, the priority encoder 820 outputs the highest-order bit position of a logical value 1, for example, a value 15 indicative of the 15$^{th}$ bit from the highest order bit.

The processes show that the area of the six bits from the ninth bit to the 15$^{th}$ bit is an area of consecutive invalid sectors. In this case, for example, the write-back controlling section 730 issues a read command to read data from the main memory 200 to the six sectors starting from the ninth sector of the segment 300.

Figure 17:
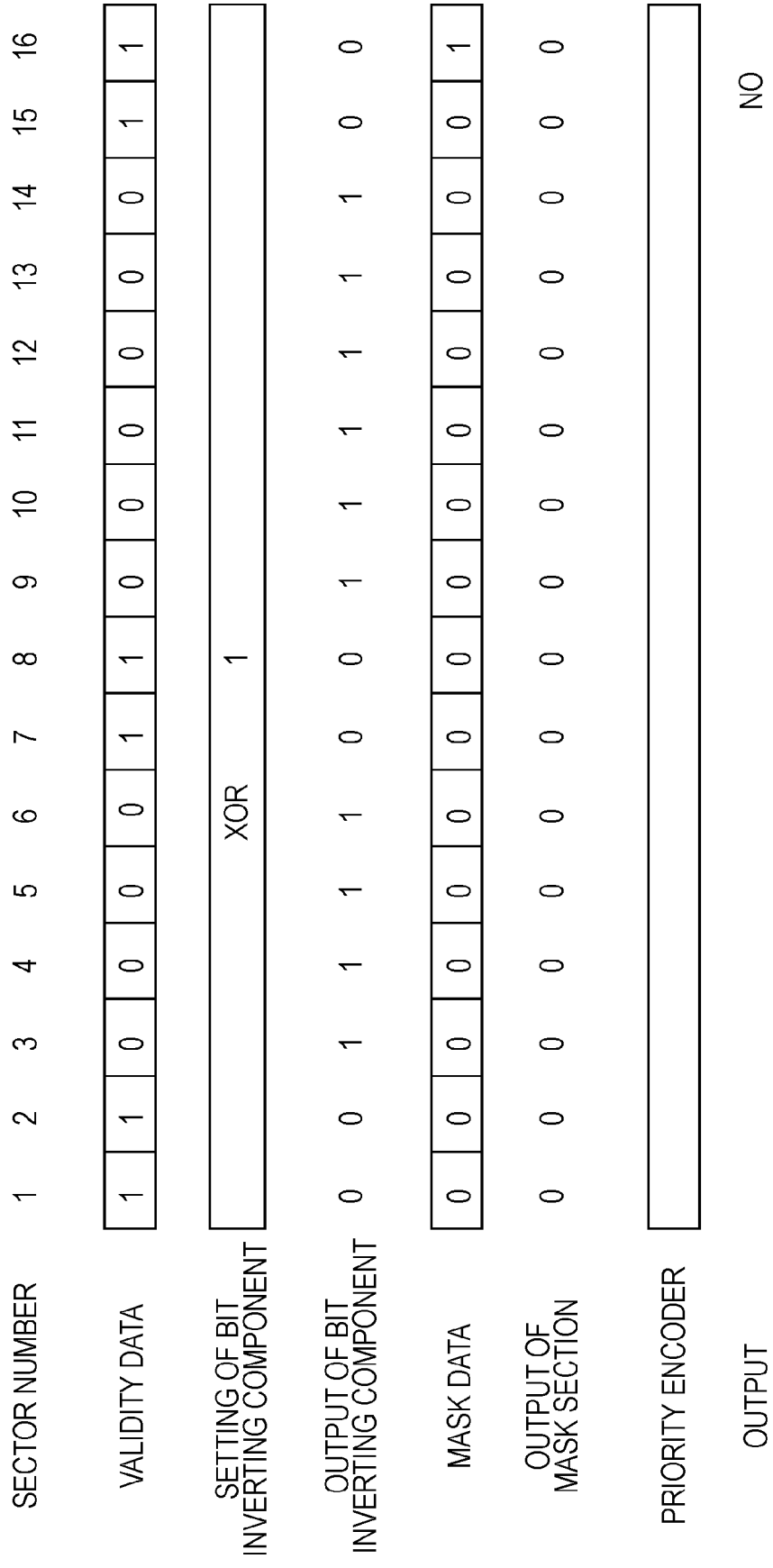
FIG. 17 shows the details of step S1220 (S1220-3) of the third cycle.

FIG. 17 shows the details of step S1220 (S1220-3) of the third cycle. In the first encoding operation of the third cycle, the bit inverting section 800 is set in an inverting state, and the bit mask section 810 is set to mask the highest-order 15 bits. If the validity data is "1100001100000011", the output of the bit inverting section 800 is inverted to "0011110011111100". The output of the bit mask section 810 is "0000000000000000". Accordingly, the priority encoder 820 outputs predetermined data indicative of the fact that no bit of a logical value 1 can be detected (for example, NO). Thus, the detecting component 720 determines that the detection of areas of consecutive invalid sectors has been completed, and finishes the processing.

Figure 18:
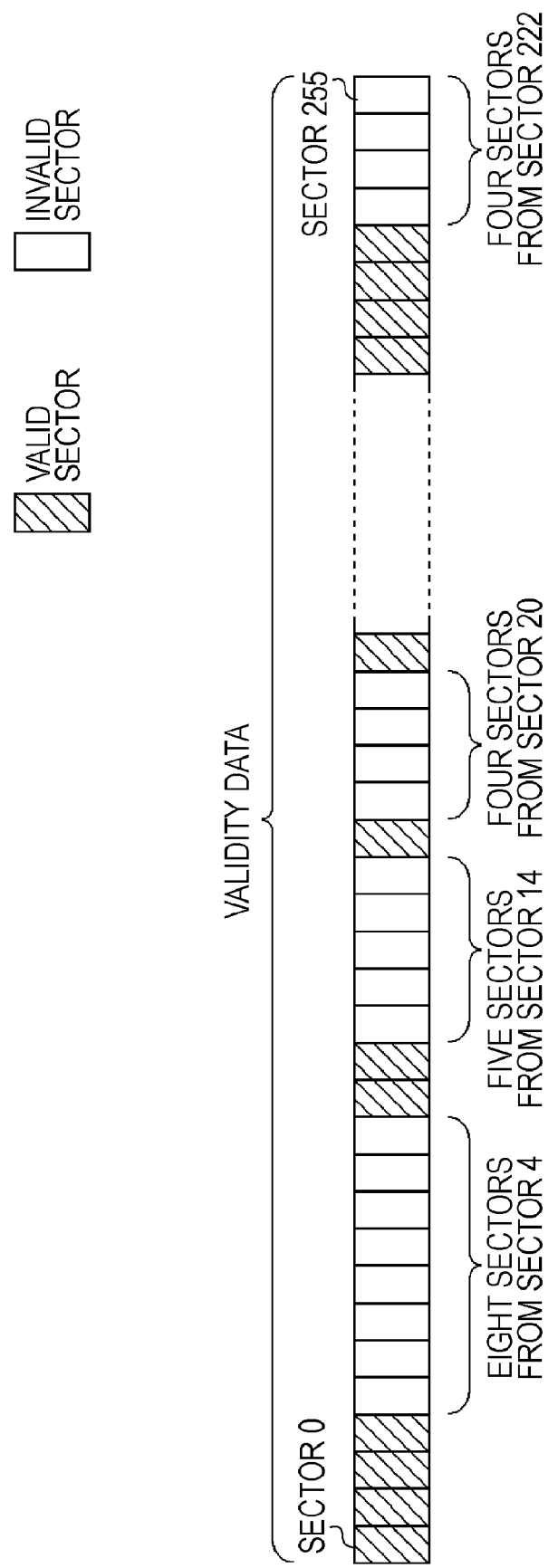
FIG. 18 shows a concrete example of areas of consecutive invalid sectors, detected from validity data.

FIG. 18 shows a concrete example of areas of consecutive invalid sectors, detected from validity data. The detecting component 720 according to this embodiment can specify a set of the start position and the end position for each area of consecutive invalid sectors, as indicated by the areas without hatch lines in FIG. 18. For example, in FIG. 18, it is detected that the eight sectors from the fourth sector, the five sectors from the 14$^{th}$ sector, the four sectors from the 20$^{th}$ sector, and the four sectors from the 222$^{nd}$ sector are areas of consecutive invalid sectors.

Thus, the process described with reference to FIGS. 12 to 18 allows areas of consecutive invalid sectors to be quickly detected from the validity data by the dedicated circuits. However, it is obvious for those skilled in the art that the detection by those circuits is one embodiment and various modifications and replacements can be made. For example, the detection of areas of consecutive invalid sectors can also be executed by a microprocessor according to a program for executing the flows of FIG. 11. For example, the program scans validity data from the top and records the bit position between the valid sectors and invalid sectors in sequence. Also with the circuits, various modifications can be made so as to achieve reduction in circuit scale and higher-speed processing. Examples will be described with reference to FIGS. 19 and 20.

Figure 19:
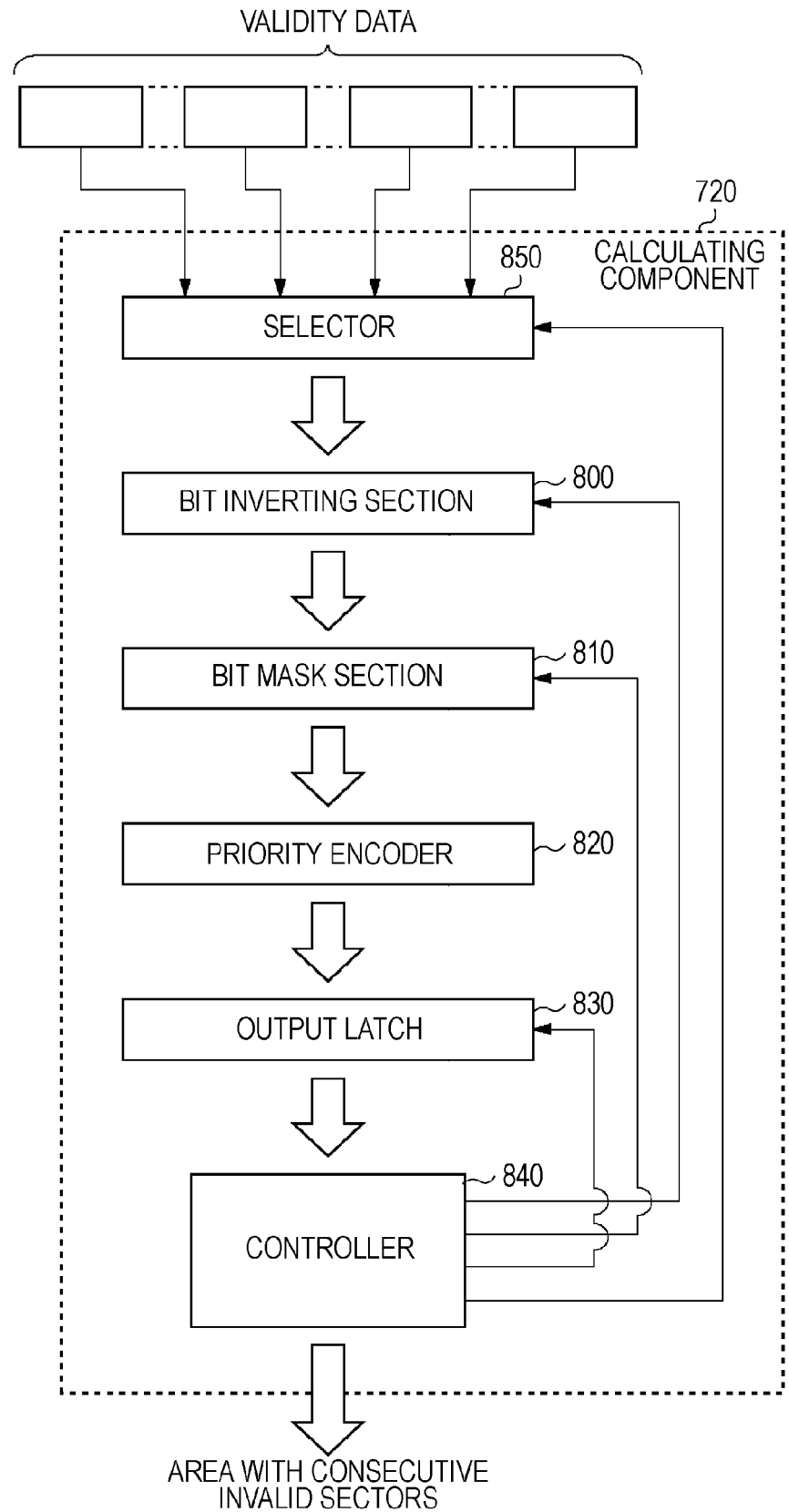
FIG. 19 is a conceptual diagram of a first modification of the detecting component 720 according to the embodiment.

FIG. 19 is a conceptual diagram of a first modification of the detecting component 720 according to the embodiment. In the first modification, the detecting component 720 further includes a selector 850 in addition to the components shown in FIG. 8. The detecting component 720 may includes a bit inverting section, a bit mask section, a priority encoder, an output latch, and a controller which can process validity data having a smaller number of bits than the bit inverting section 800, the bit mask section 810, the priority encoder 820, the output latch 830, and the controller 840 shown in FIG. 8. FIG. 19 shows the components with the same reference numerals as those of FIG. 8, for clarification of the correspondence.

The selector 850 selects each of a plurality of split partial data of the validity data corresponding to one segment 300 in sequence, and outputs them to the bit inverting section 800. If the validity data is a 128-bit string, the partial data is one of the four-split strings, or a 32-bit string. The bit inverting section 800 inverts or does not invert each bit of the input partial data according to its setting, and outputs them. The bit mask section 810 inputs the partial data output from the bit inverting section 800, wherein if a mask pattern is set, the bit mask section 810 masks the partial data with the mask pattern, or if no mask pattern is set, the bit mask section 810 outputs the partial data as it is.

The priority encoder 820 detects the highest-order bit whose logical value is true from the partial data output from the bit mask section 810, and outputs its bit position. The output latch 830 stores the output bit position, and outputs the information of the bit position to the controller 840 at a predetermined timing. The controller 840 changes the setting of the bit inverting section 800 every time a bit position is input from the priority encoder 820, and sets a mask pattern to the bit mask section 810, for masking the bit string from the highest-order bit to the bit position of the partial data. If no bit position of logical value 1 is detected, the controller 840 instructs the selector 850 to change the setting so as to select the next partial data.

According to the first modification, the circuit scale of the detecting component 720 can be reduced by repeatedly using the circuit provided for a smaller number of bits than validity data. Particularly, the priority encoder 820 is significantly increased in circuit scale as the number of bits increases. The first modification can remarkably reduce the circuit scale.

Next, a second modification will be described as an example of reducing the circuit scale with little delay to the detecting process itself.

Figure 20:
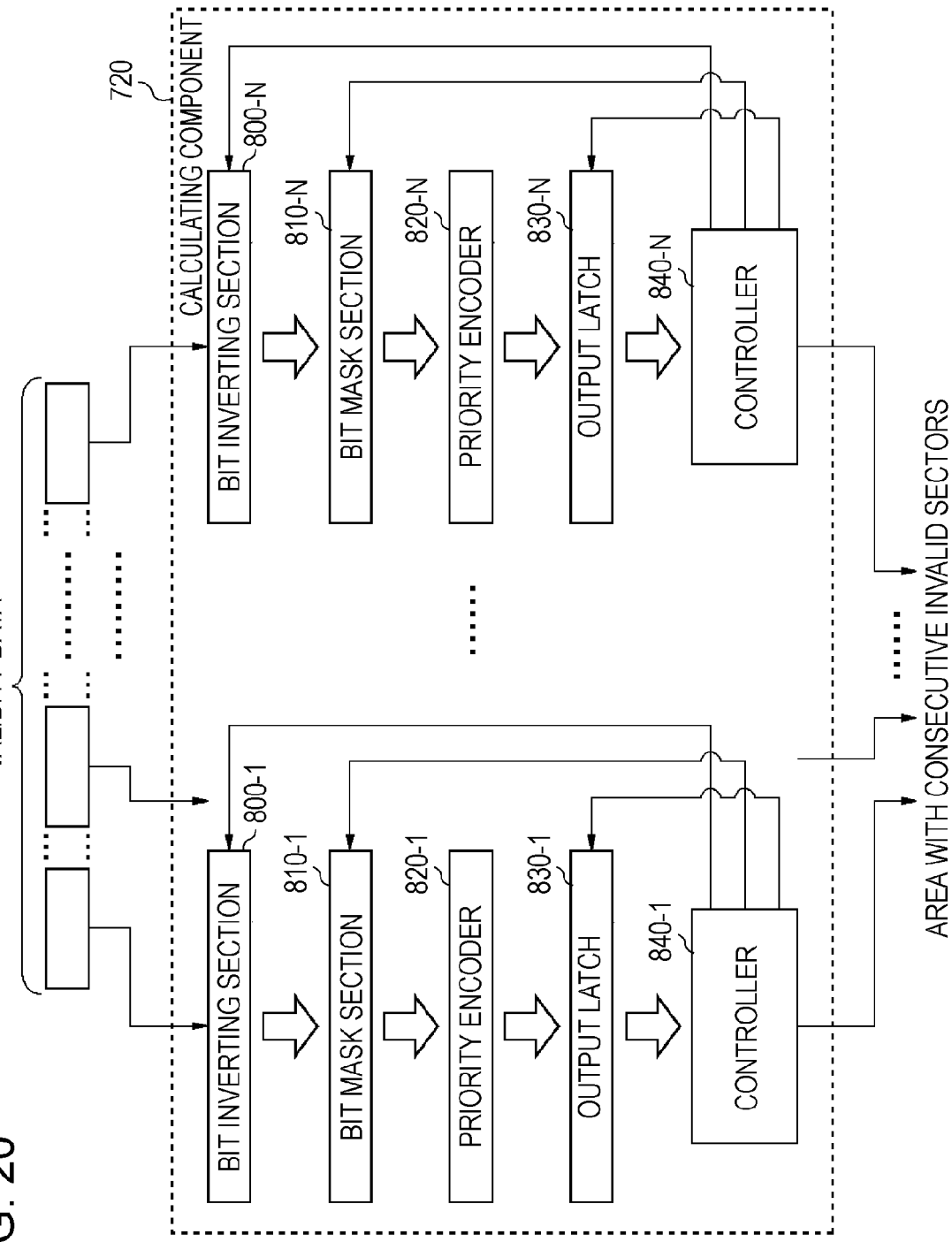
FIG. 20 is a conceptual diagram of a second modification of the detecting component 720 according to the embodiment.

FIG. 20 is a conceptual diagram of a second modification of the detecting component 720 according to the embodiment. This detecting component 720 includes a plurality of bit inverting sections, a plurality of bit mask sections, a plurality of priority encoders, a plurality of output latches, and a plurality of controllers. The components are provided for a bit string having a smaller number of bits as compared with the bit inverting section 800, the bit mask section 810, the priority encoder 820, the output latch 830, and the controller 840 described with reference to FIG. 8.

The bit inverting sections are denoted by 800-1 to 800-N, the bit mask sections are denoted by 810-1 to 810-N, the priority encoders are denoted by 820-1 to 820-N, the output latches are denoted by 830-1 to 830-N, and the controllers are denoted by 840-1 to 840-N using the same reference numerals for clarification of the correspondence. Components with the same subscript correspond to each other. For example, the bit inverting section 800-1 corresponds to the bit mask section 810-1.

The bit inverting sections 800-1 to 800-N input a plurality of split partial data read from the cache memory 210, and invert or do not invert each bit of the input partial data according to a setting, and output them. The bit mask sections 810-1 to 810-N input the partial data output from the corresponding bit inverting sections, wherein if a mask pattern is set, the bit mask sections 810-1 to 810-N mask the partial data with the mask pattern, or if no mask pattern is set, the bit mask sections 810-1 to 810-N output the partial data as is, respectively.

The priority encoders 820-1 to 820-N detect the highest-order bit whose logical value is true from the partial data output from the corresponding bit mask sections, and output its bit position. The output latches 830-1 to 830-N hold the respective output bit positions, and output the information of the bit positions to corresponding controllers at a predetermined timing. The controllers 840-1 to 84-N change the setting of the corresponding bit inverting sections every time a bit position is input from corresponding priority encoders, and set a mask pattern to corresponding bit mask sections, for masking the bit string from the highest-order bit to the bit position of the partial data.

The detecting component 720 specifies areas of consecutive invalid sectors according to the bit positions output from the controllers 840-1 to 840-N.

Thus, according to the second modification, reduction in processing speed can be prevented while the circuit scale is decreased by using a plurality of circuits provided for a short bit string in place of a circuit for a long bit string. For example, the circuit scale of the priority encoder is not in proportion to the number of bits of an adaptable bit string, but increases in proportion to a significantly large number, e.g., the square of 2. The split circuits can remarkably reduce the circuit scale.

With the memory apparatus 20 according to this embodiment, the number of accesses to the main memory can be significantly reduced by delaying reading from the main memory until the timing of writing back without reading from the main memory at a write cache miss. Accordingly, in the case where the main memory is achieved by a flash memory or the like, the memory apparatus 20 provides various peculiar advantages of increasing not only access speed but also device life. Furthermore, the memory apparatus 20 can reduce the loads on the memory apparatus 20, the cache controlling component 220, and other control circuits by detecting areas of consecutive invalid sectors when writing back data, and issuing a command for each area to thereby reduce the number of commands issued. This enables continuous access not only to the main memory 200 but also to the cache memory 210, thereby increasing the efficiency of the overall process of the memory apparatus 20.

Although the invention has been described in its preferred form, it is to be understood that the technical scope of the invention is not limited to that described in the embodiment. It will be apparent to those skilled in the art that various changes or modifications can be made in the embodiment. It is therefore apparent from the description of the claims that such changes or modifications can be included in the technical scope of the invention without departing from the scope of the appended claims.

The invention claimed is:

1. A method for caching data, which is to be written back to a main memory, in a cache memory in a memory apparatus, the memory apparatus comprising:
   a cache memory including a plurality of cache segments, memorizing, for each cache segment, validity data indicative of whether or not each of the sectors contained in each cache segment is a valid sector inclusive of valid data; and
   a cache controlling component controlling access to the cache memory; and
   the method of the cache controlling component comprising the steps of:
   detecting, at a detecting component, when writing a cache segment back to the main memory, areas having consecutive invalid sectors by accessing validity data corresponding to the cache segment; and
   issuing, for each area detected, a read command to the main memory, making each area a valid sector, and writing the data in the cache segment back to the main memory,
   wherein the validity data is a bit string in which logical values are arrayed, the logical values each indicating whether or not each sector is valid; and wherein detecting comprises steps of:

a bit inverting section inputting the validity data read from the cache memory, and inverting or not inverting each of the bits of the validity data, and outputting them;

a bit mask section inputting the validity data output from the bit inverting section, wherein when a mask pattern is set, the bit mask section masks the validity data with the mask pattern, and if no mask pattern is set, the bit mask section outputs the validity data unchanged; and a priority encoder detecting the highest-order bit whose logical value is true from the validity data output from the bit mask section, and outputting a bit position of the highest-order bit; and a controller changing the setting of the bit inverting section every time a bit position is input from the priority encoder and setting a mask pattern to the bit mask section, the mask pattern masking the bit string from the highest-order bit to the input bit position; and detecting the bit positions output from the priority encoder in sequence as boundaries between areas having consecutive invalid sectors and valid sectors.

2. The method according to claim 1, wherein
the detecting component further comprises a selecting section selecting in sequence each of a plurality of split partial data of the validity data corresponding to one cache segment and inputting the data to the bit inverting section;

the bit inverting section performing one of inverting or not inverting the bits of the input partial data according to a predetermined setting, and outputting them;

the bit mask section inputting the partial data output from the bit inverting section, wherein if a mask pattern is set, the bit mask section masks the partial data with the mask pattern, and if no mask pattern is set, the bit mask section outputs the partial data unchanged;

the priority encoder detecting the highest-order bit whose logical value is true from the partial data output from the bit mask section, and outputting the bit position; and the controller, every time a bit position is input from the priority encoder, changing the setting of the bit inverting section, and setting a mask pattern to the bit mask section, the mask pattern masking the bit string from the highest-order bit of the partial data to the input bit position.

3. The method according to claim 1 wherein the detecting component comprises a plurality of the bit inverting sections, a plurality of the bit mask sections, a plurality of the priority encoders, and a plurality of the controllers, wherein
the bit inverting sections each input the split partial validity data read from the cache memory, and invert or do not invert the bits of the input partial data according to a setting, and output them;

the bit mask sections each input the partial data output from a corresponding bit inverting section, wherein if a mask pattern is set, the bit mask pattern masks the partial data with the mask pattern, and if no mask pattern is set, the bit mask pattern outputs the partial data unchanged;

the priority encoders each detect the highest-order bit whose logical value is true from the partial data output from a corresponding bit mask section, and outputs the bit position; and the controllers, every time a bit position is input from a corresponding priority encoder, each change the setting of a corresponding bit inverting section, and set a mask pattern to a corresponding bit mask section, the mask pattern masking the bit string from the highest-order bit of the partial data to the input bit position.

4. A program stored on a non-transitory tangible medium for controlling a memory apparatus that caches data to be written to a main memory, the memory apparatus comprising:
a cache memory including a plurality of cache segments, and memorizing, for each cache segment, validity data indicative of whether or not each of the sectors contained in each cache segment is a valid sector; and a cache controlling component for controlling access to the cache memory; and the program product for the cache controlling component including:

program code for detecting, when writing a cache segment back to the main memory, areas having consecutive invalid sectors by accessing validity data corresponding to the cache segment; and program code for issuing, for each area detected, a read command to the main memory, making each area a valid sector, and writing the data in the cache segment back to the main memory, and wherein the validity data is a bit string in which logical values are arrayed, the logical values each indicating whether or not each sector is valid; and wherein the program code for detecting comprises:
a bit inverting program code section inputting the validity data read from the cache memory, and inverting or not inverting each of the bits of the validity data, and outputting them;

a bit mask program code section inputting the validity data output from the bit inverting program code section, wherein when a mask pattern is set, the bit mask program code section masks the validity data with the mask pattern, and if no mask pattern is set, the bit mask section outputs the validity data unchanged; and a priority encoder program code detecting the highest-order bit whose logical value is true from the validity data output from the bit mask program code section, outputting a bit position of the highest-order bit, and, a controller for, every time a bit position is input from the priority encoder, changing the setting of the bit inverting section, and setting a mask pattern to the bit mask section, the mask pattern masking the bit string from the highest-order bit to the input bit position, and detecting the bit positions output from the priority encoder in sequence as boundaries between areas having consecutive invalid sectors and valid sectors.

5. The program according to claim 4 wherein the program code for detecting further comprises a selecting section selecting in sequence each of a plurality of split partial data of the validity data corresponding to one cache segment and inputting the data to the bit inverting section;

the bit inverting section performing one of inverting or not inverting the bits of the input partial data according to a predetermined setting, and outputting them;

the bit mask section inputting the partial data output from the bit inverting section, wherein if a mask pattern is set, the bit mask section masks the partial data with the mask pattern, and if no mask pattern is set, the bit mask section outputs the partial data unchanged;

the priority encoder detecting the highest-order bit whose logical value is true from the partial data output from the bit mask section, and outputting the bit position; and the controller, every time a bit position is input from the priority encoder, changing the setting of the bit inverting section, and setting a mask pattern to the bit mask section, the mask pattern masking the bit string from the highest-order bit of the partial data to the input bit position.

6. The program according to claim 4, wherein

The program code for detecting comprises a plurality of the bit inverting sections, a plurality of the bit mask sections, a plurality of the priority encoders, and a plurality of the controllers, wherein the bit inverting sections each input the split partial validity data read from the cache memory, and invert or do not invert the bits of the input partial data according to a setting, and output them;

the bit mask sections each input the partial data output from a corresponding bit inverting section, wherein if a mask pattern is set, the bit mask pattern masks the partial data with the mask pattern, and if no mask pattern is set, the bit mask pattern outputs the partial data unchanged;

the priority encoders each detect the highest-order bit whose logical value is true from the partial data output from a corresponding bit mask section, and outputs the bit position; and the controllers, every time a bit position is input from a corresponding priority encoder, each change the setting of a corresponding bit inverting section, and set a mask pattern to a corresponding bit mask section, the mask pattern masking the bit string from the highest-order bit of the partial data to the input bit position.

7. A memory apparatus that caches data to be written to a main memory, the memory apparatus comprising:

a cache memory including a plurality of cache segments, and having a cache memory component for memorizing, for each cache segment, validity data indicative of whether or not each sector contained in each cache segment is a valid sector inclusive of valid data; and a cache controlling component for controlling access to the cache memory, wherein the cache controlling component includes:

a detecting component for detecting, when writing a cache segment back to the main memory, areas having consecutive invalid sectors by accessing validity data corresponding to the cache segment; and a write-back controlling component issuing a read command to the main memory, the read command being for reading data to each area detected, making the area a valid sector, and writing the data in the cache segment back to the main memory, wherein the validity data is a bit string in which logical values are arrayed, the logical values each indicating whether or not each sector is valid; and the detecting component includes:

a bit inverting section inputting the validity data read from the cache memory, and inverting or not inverting each of the bits of the validity data, and outputting them;

a bit mask section inputting the validity data output from the bit inverting section, wherein when a mask pattern is set, the bit mask section masks the validity data with the mask pattern, and if no mask pattern is set, the bit mask section outputs the validity data unchanged; and a priority encoder detecting the highest-order bit whose logical value is true from the validity data output from the bit mask section, and outputting a bit position of the highest-order bit; and a controller, every time a bit position is input from the priority encoder, changing the setting of the bit inverting section, and setting a mask pattern to the bit mask section, the mask pattern masking the bit string from the highest-order bit to the input bit position; and the detecting component detecting the bit positions output from the priority encoder in sequence as boundaries between areas having consecutive invalid sectors and valid sectors.

8. The memory apparatus according to claim 7, wherein the cache segment is assigned to at least part of a memory block that is a unit of writing and having a data size larger than that of the cache segment; and wherein the write-back controlling component causes a cache segment to be written back to a valid sector, reads data corresponding to another cache segment in the memory block from the main memory, and writes the cache segment and the read data back to the memory block.

9. The memory apparatus according to claim 7, wherein the cache controlling component further comprising a write controlling component that assigns a new cache segment to cache write data in response to a write cache miss to a sector, writes the write data to a sector in the cache segment, and resets validity data corresponding to sectors other than the write target sector.

10. The memory apparatus according to claim 9, wherein, in response to a write cache hit to a sector, the write control section writes write data to the sector in the cache segment assigned to cache the write data, and sets the validity data corresponding to the sector valid.

11. The memory apparatus according to claim 7, wherein the detecting component further includes a selecting section for selecting in sequence each of a plurality of split partial data of the validity data corresponding to one cache segment and inputting the data to the bit inverting section;

the bit inverting section performing one of inverting or not inverting the bits of the input partial data according to a predetermined setting, and outputting them;

the bit mask section inputting the partial data output from the bit inverting section, wherein if a mask pattern is set, the bit mask section masks the partial data with the mask pattern, and if no mask pattern is set, the bit mask section outputs the partial data unchanged;

the priority encoder detecting the highest-order bit whose logical value is true from the partial data output from the bit mask section, and outputting the bit position; and the controller, every time a bit position is input from the priority encoder, changing the setting of the bit inverting section, and setting a mask pattern to the bit mask section, the mask pattern masking the bit string from the highest-order bit of the partial data to the input bit position.

12. The memory apparatus according to claim 7, wherein the detecting component comprises a plurality of the bit inverting sections, a plurality of the bit mask sections, a plurality of the priority encoders, and a plurality of the controllers, wherein the bit inverting sections each input the split partial validity data read from the cache memory, and invert or do not invert the bits of the input partial data according to a setting, and output them;

the bit mask sections each input the partial data output from a corresponding bit inverting section, wherein if a mask pattern is set, the bit mask pattern masks the partial data with the mask pattern, and if no mask pattern is set, the bit mask pattern outputs the partial data unchanged;

the priority encoders each detect the highest-order bit whose logical value is true from the partial data output from a corresponding bit mask section, and outputs the bit position; and the controllers, every time a bit position is input from a corresponding priority encoder, each change the setting of a corresponding bit inverting section, and set a mask pattern to a corresponding bit mask section, the mask pattern masking the bit string from the highest-order bit of the partial data to the input bit position.

13. The memory apparatus according to claim 9, wherein the detecting component selects a cache segment including a valid sector under the condition that the proportion of cache segments including a valid sector of the cache segments in the cache memory has exceeded a predetermined reference value, and writes the cache segment back to the main memory.

14. The memory apparatus according to claim 7, further comprising a main memory.

15. The memory apparatus according to claim 14, wherein the main memory includes at least one flash memory.

* * * * *